(12) United States Patent (10) Patent No.: US 12,666,320 B2
Zhao (45) Date of Patent: Jun. 23, 2026

(54) TIMING ADVANCE COMPENSATION METHOD, BASE STATION, TERMINAL, AND STORAGE MEDIUM

(71) Applicant: DATANG MOBILE COMMUNICATIONS EQUIPMENT CO., LTD., Beijing (CN)

(72) Inventor: Yali Zhao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 607 days.

(21) Appl. No.: 18/022,744

(22) PCT Filed: Aug. 26, 2021

(86) PCT No.: PCT/CN2021/114735
§ 371 (c)(1),
(2) Date: Feb. 22, 2023

(87) PCT Pub. No.: WO2022/062824
PCT Pub. Date: Mar. 31, 2022

(65) Prior Publication Data
US 2023/0232289 A1 Jul. 20, 2023

(30) Foreign Application Priority Data
Sep. 24, 2020 (CN) .......................... 202011017319.7

(51) Int. Cl.
*H04W 36/00* (2009.01)
*H04W 56/00* (2009.01)
*H04W 84/06* (2009.01)

(52) U.S. Cl.
CPC ... *H04W 36/0072* (2013.01); *H04W 56/0045* (2013.01); *H04W 84/06* (2013.01)

(58) Field of Classification Search
CPC ......... H04W 36/0005; H04W 36/0072; H04W 56/0045; H04W 36/0077; H04W 36/16;
(Continued)

(56) References Cited

U.S. PATENT DOCUMENTS

2018/0091986 A1* 3/2018 Pedersen ............... H04W 36/26
2018/0279186 A1* 9/2018 Park .................... H04W 36/302
(Continued)

FOREIGN PATENT DOCUMENTS

CN 103945471 A 7/2014
CN 107734629 A 2/2018
(Continued)

OTHER PUBLICATIONS

Nokia et al.,"Timing Advance, Random Access and DRX aspects in NTN", 3GPP TSG-RAN WG2 Meeting #111 Electronic, Elbonia, Aug. 17-28, 2020, total 9 pages, R2-2007590.
(Continued)

*Primary Examiner* — Bailor C Hsu
(74) *Attorney, Agent, or Firm* — KILPATRICK TOWNSEND & STOCKTON LLP

(57) ABSTRACT

Embodiments of the present application provide a timing advance (TA) compensation method, a base station, a terminal, and a storage medium. The method includes by means of an interface between network devices, a target base station to which a target cell belongs transmits, to a source base station to which a source cell belongs, TA compensation related information used for a terminal to perform uplink transmission in the target cell. According to the embodiments of the present application, when a terminal performs cell handover, TA compensation related information used for the terminal to perform uplink transmission in a target cell is transmitted to the terminal, and the terminal may clearly and accurately determine a TA pre-compensa-
(Continued)

Transmitting, by a target base station to which a target cell belongs, information associated with timing advance (TA) compensation to a source base station to which a source cell belongs through an interface between network devices, wherein the information associated with TA compensation is used during a user equipment (UE) performing uplink transmission in the target cell

300 tion value used for the target cell to which the terminal is handed over, and reasonably perform TA compensation, to improve the cell handover success rate of the terminal and reducing handover delay.

15 Claims, 9 Drawing Sheets

(58) Field of Classification Search
  CPC ......... H04W 74/0833; H04W 74/0891; H04W 84/06; H04B 7/18513; H04B 7/18541
  See application file for complete search history.

(56) References Cited

U.S. PATENT DOCUMENTS

| | | | |
|---|---|---|---|
| 2020/0196263 A1 | 6/2020 | Heyn et al. | |
| 2020/0296635 A1* | 9/2020 | Rastegardoost | ...... H04L 5/0048 |
| 2020/0314709 A1* | 10/2020 | Ly | ................... H04W 36/00725 |
| 2021/0136641 A1* | 5/2021 | Roy | ................... H04W 36/249 |
| 2021/0227481 A1* | 7/2021 | Xu | ...................... H04W 56/005 |
| 2022/0086780 A1* | 3/2022 | Tsai | ................... H04W 56/006 |
| 2023/0224748 A1* | 7/2023 | Park | ...................... H04W 24/02 |
| | | | 370/329 |
| 2023/0344508 A1* | 10/2023 | Tseng | ................ H04W 56/0045 |
| 2023/0350078 A1* | 11/2023 | Cozzo | ................. H04W 56/001 |
| 2023/0413131 A1* | 12/2023 | Shrestha | ............... H04W 72/23 |

FOREIGN PATENT DOCUMENTS

| | | |
|---|---|---|
| CN | 109788548 A | 5/2019 |
| CN | 111698735 A | 9/2020 |
| WO | 2019193891 A1 | 10/2019 |

OTHER PUBLICATIONS

Ericsson,"TP on remaining details on Random access for NTN", 3GPP TSG-RAN WG2 #108, Reno, Nevada, US, Nov. 18-22, 2019, total 3 pages, R2-1916414.

European Patent Office, Extended European Search Report Issued in Application No. 21871197.6, Nov. 7, 2024, Germany, 8 pages.

Itri,"Early RACH Access with Reserved Signatures for inter-eNB Handover", 3GPP TSG-RAN WG2 Meeting #57bis, St. Julian's, Malta, Mar. 26 30, 2007, total 4 pages, R2-071379.

* cited by examiner

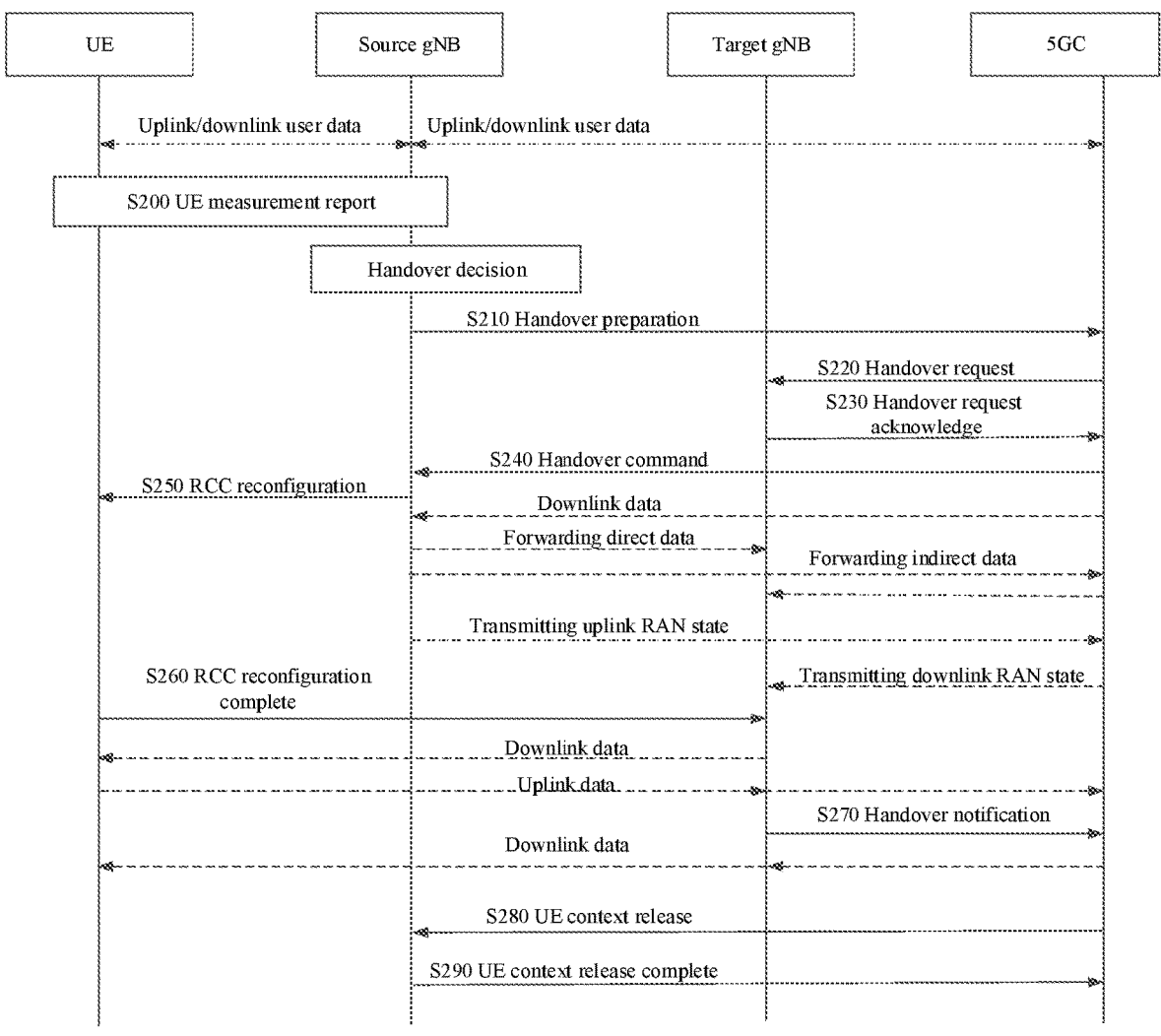

| UE | Source gNB | Target gNB | 5GC |

Uplink/downlink user data — Uplink/downlink user data

S200 UE measurement report

Handover decision

S210 Handover preparation

S220 Handover request

S230 Handover request acknowledge

S240 Handover command

S250 RCC reconfiguration

Downlink data

Forwarding direct data

Forwarding indirect data

Transmitting uplink RAN state

S260 RCC reconfiguration complete

Transmitting downlink RAN state

Downlink data

Uplink data

S270 Handover notification

Downlink data

S280 UE context release

S290 UE context release complete

FIG. 2

Transmitting, by a target base station to which a target cell belongs, information associated with timing advance (TA) compensation to a source base station to which a source cell belongs through an interface between network devices, wherein the information associated with TA compensation is used during a user equipment (UE) performing uplink transmission in the target cell

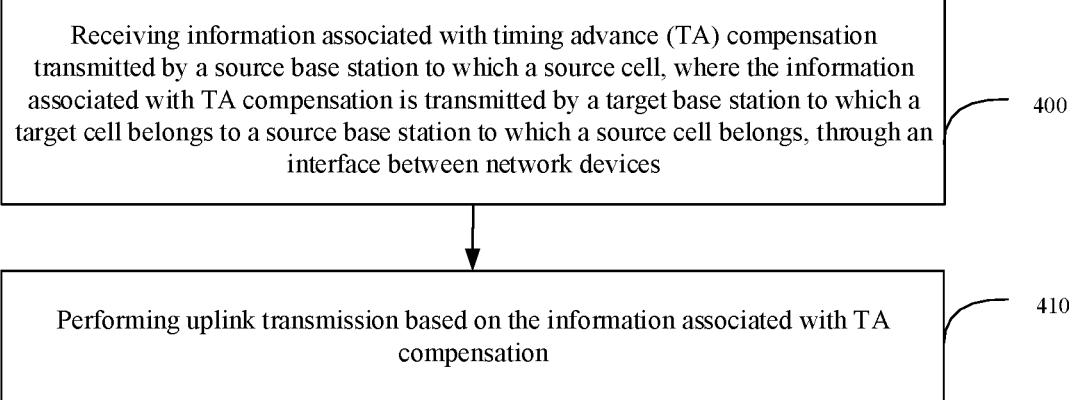

Receiving information associated with timing advance (TA) compensation transmitted by a source base station to which a source cell, where the information associated with TA compensation is transmitted by a target base station to which a target cell belongs to a source base station to which a source cell belongs, through an interface between network devices — 400

Performing uplink transmission based on the information associated with TA compensation — 410

FIG. 4

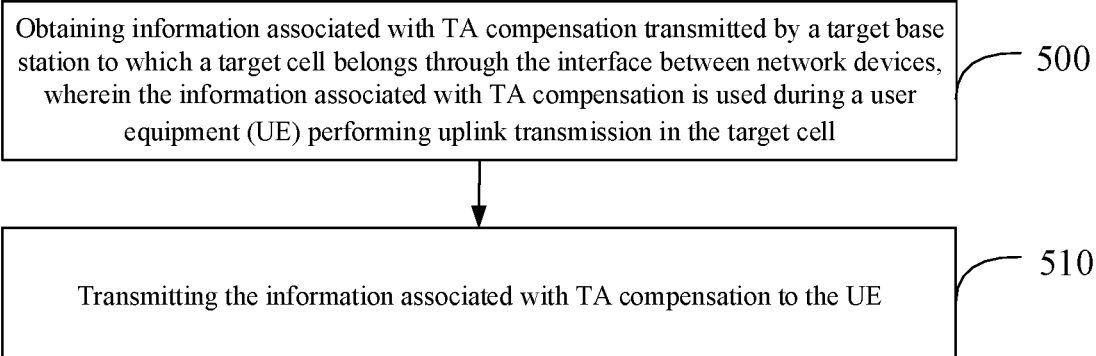

Obtaining information associated with TA compensation transmitted by a target base station to which a target cell belongs through the interface between network devices, wherein the information associated with TA compensation is used during a user equipment (UE) performing uplink transmission in the target cell — 500

Transmitting the information associated with TA compensation to the UE — 510

FIG. 5

| UE | Source gNB | Target gNB | 5GC |
|----|-----------|-----------|-----|

Uplink/downlink user data     Uplink/downlink user data

S900 UE measurement report

Handover decision

S910 Handover preparation

S920 Handover request

S930 Handover request acknowledge

S940 Handover command

S950 RCC reconfiguration

Downlink data

Forwarding direct data

Forwarding indirect data

Transmitting uplink RAN state

Transmitting downlink RAN state

S960 RCC reconfiguration complete

Downlink data

Uplink data

S970 Handover notification

Downlink data

S980 UE context release

S990 UE context release complete

FIG. 9

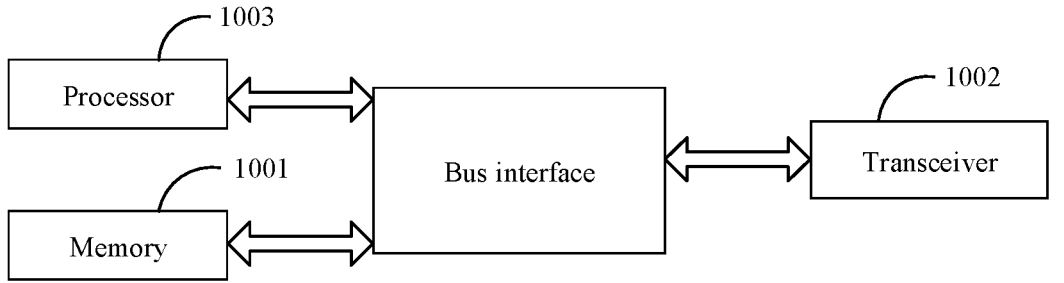

TIMING ADVANCE COMPENSATION METHOD, BASE STATION, TERMINAL, AND STORAGE MEDIUM

CROSS-REFERENCE TO RELATED APPLICATION

The present application is a National Stage of International Application No. PCT/CN2021/114735, filed on Aug. 26, 2021, which claims priority to Chinese application No. 2020110173197 filed on Sep. 24, 2020, entitled "Timing Advance Compensation Method, Base Station, Terminal and Storage Medium", which are hereby incorporated by reference in their entireties.

FIELD

The present application relates to the field of communication technologies, and in particular, to methods for compensating timing advance, base stations, terminals, and a storage medium.

BACKGROUND

It is generally believed that timing advance (TA) precompensation is required for random access to a satellite communication system due to large round trip time (RTT) of the satellite system.

During traditional cell handover procedures, the TA used by user equipment (UE) for the first uplink transmission is unreasonable when accessing a target cell since a TA precompensation value that may be used in the target cell is unable to be obtained, which results in a random access failure and reduces a rate of successful handover.

Therefore, how to propose a reasonable method for compensating timing advance has become an urgent problem to be solved.

SUMMARY

In view of a problem of low rate of successful handover in a cell handover procedure, embodiments of the present application provide a method for compensating timing advance, a base station, a terminal, and a storage medium for improving the rate of successful cell handover for UE.

An embodiment of the present application provides a method for compensating timing advance, including:

transmitting, by a target base station (target gNB) to which a target cell belongs, information associated with timing advance (TA) compensation used during UE performing uplink transmission in the target cell to a source base station (source gNB) to which a source cell belongs through an interface between network devices.

In an embodiment, the source cell or the target cell is any one of the following types of cells:

a terrestrial cell;

a satellite cell.

In an embodiment, the performing uplink transmission in the target cell is a first message for a random access procedure initiated by UE in the target cell or a first physical uplink shared channel (PUSCH) transmission performed by UE in the target cell.

In an embodiment, the interface between the network devices is:

an Xn interface between a source base station and a target base station; or

a next generation (NG) interface between a target base station and a core network device; or an NG interface between the core network device and the source base station.

In an embodiment, the transmitting, by a target base station to which a target cell belongs, information associated with timing advance (TA) compensation used during UE performing uplink transmission in the target cell to a source base station to which a source cell belongs through an interface between network devices, includes:

transmitting the information associated with TA compensation to a source base station through the Xn interface after receiving a handover request for UE transmitted by the source base station through the Xn interface, in case that the interface between the network devices is an Xn interface; or receiving a handover request for the UE transmitted by a core network device, in case that the interface between the network devices is an NG interface, where the handover request is transmitted by the source base station to the core network device through the NG interface; and transmitting the information associated with TA compensation to the core network device for the core network device to transmit the information associated with TA compensation to the source base station through the NG interface.

In an embodiment, the information associated with TA compensation includes any one or more of the following items:

transmission delay of feeder links in the target cell;

a TA compensation value for the target cell;

ephemeris information;

location information of a reference point in the target cell and TA corresponding to the reference point in the target cell; and indication information of a cell type of the target cell, where the cell type is a terrestrial cell or a satellite cell.

In an embodiment, in case that the target cell is a terrestrial cell, the information associated with TA compensation includes any one or more of the following items:

a TA compensation value for the target cell; and indication information of a cell type of the target cell.

In an embodiment, in case that the target cell is a satellite cell and the satellite is a pass-through mode satellite, the method further includes: compensating, by the target base station, transmission delay of feeder links.

An embodiment of the present application provides a method for compensating timing advance, including:

receiving information associated with timing advance (TA) compensation transmitted by a source base station to which a source cell, where the information associated with TA compensation is transmitted by a target base station to which a target cell belongs to a source base station to which a source cell belongs, through an interface between network devices; and performing uplink transmission based on the information associated with TA compensation.

In an embodiment, the source cell or the target cell is any one of the following types of cells:

a terrestrial cell;

a satellite cell.

In an embodiment, the uplink transmission is a first message for a random access procedure initiated by UE in the target cell or a first physical uplink shared channel (PUSCH) transmission performed by UE in the target cell.

In an embodiment, the interface between the network devices is:

an Xn interface between a source base station and a target base station; or a next generation (NG) interface between a target base station and a core network device; or an NG interface between the core network device and the source base station.

In an embodiment, the information associated with TA compensation includes any one or more of the following items:

transmission delay of feeder links in the target cell;

a TA compensation value for the target cell;

ephemeris information;

location information of a reference point in the target cell and TA corresponding to the reference point in the target cell; and indication information of a cell type of the target cell, where the cell type may be the terrestrial cell or the satellite cell.

In an embodiment, the performing uplink transmission based on the information associated with TA compensation includes:

determining, based on location information of UE, the ephemeris information and the transmission delay of feeder links in the target cell, a TA value used for performing uplink transmission in the target cell, in case that the information associated with TA compensation is the transmission delay of feeder links in the target cell;

determining the TA compensation value for the target cell as a TA value used for performing uplink transmission in the target cell, in case that the information associated with TA compensation is the TA compensation value for the target cell;

determining, based on UE location information and the ephemeris information, a TA value used for performing uplink transmission in the target cell, in case that the information associated with TA compensation is the ephemeris information;

calculating a difference between TA corresponding to the target cell and TA for the UE based on the UE location information and the location information of the reference point in the target cell, and determining a TA value used for performing uplink transmission in the target cell based on the difference and TA corresponding to the reference point in the target cell, in case that the information associated with TA compensation is location information of a reference point in the target cell and the TA corresponding to the reference point in the target cell;

determining the target cell to be a terrestrial cell based on the indication information of a cell type of the target cell and determining a TA value used for performing uplink transmission in the target cell to be 0, in case that the information associated with TA compensation is the indication information of a cell type of the target cell; and performing uplink transmission in the target cell based on the TA value.

In an embodiment, the receiving information associated with TA compensation transmitted by a source base station to which a source cell, includes:

receiving a radio resource control (RRC) reconfiguration message transmitted by the source base station, where the RRC reconfiguration message includes the information associated with TA compensation.

An embodiment of the present application provides a method for compensating timing advance, including:

obtaining information associated with TA compensation used during UE performing uplink transmission in the target cell, transmitted by a target base station to which a target cell belongs through the interface between network devices; and transmitting the information associated with TA compensation to the UE.

In an embodiment, the source cell or the target cell is any one of the following types of cells:

a terrestrial cell;

a satellite cell.

In an embodiment, the performing uplink transmission in the target cell is a first message for a random access procedure initiated by UE in the target cell or a first physical uplink shared channel (PUSCH) transmission performed by UE in the target cell.

In an embodiment, the interface between the network devices is:

an Xn interface between a source base station and a target base station; or a next generation (NG) interface between a target base station and a core network device; or an NG interface between the core network device and the source base station.

In an embodiment, the obtaining information associated with TA compensation used during UE performing uplink transmission in the target cell, transmitted by a target base station to which a target cell belongs through the interface between network devices, includes:

receiving information associated with TA compensation transmitted by the target base station through the Xn interface after transmitting a handover request for the UE to the target base station through the Xn interface, in case that the interface between the network devices is an Xn interface;

transmitting the handover request for the UE to a core network device through the NG interface for the target base station to transmit the information associated with TA compensation to the core network device after the handover request forwarded by the core network device is received, in case that the interface between the network devices is an NG interface; and receiving the information associated with TA compensation transmitted by the core network device through the NG interface.

In an embodiment, the information associated with TA compensation includes any one or more of the following items:

transmission delay of feeder links in the target cell;

a TA compensation value for the target cell;

ephemeris information;

location information of a reference point in the target cell and TA corresponding to the reference point in the target cell; and indication information of a cell type of the target cell, where the cell type is a terrestrial cell or a satellite cell.

In an embodiment, the transmitting the information associated with TA compensation to the UE includes:

transmitting a radio resource control (RRC) reconfiguration message to the UE, where the RRC reconfiguration message includes the information associated with TA compensation.

An embodiment of the present application provides a base station, including a memory, a transceiver, and a processor, where the memory is configured to store a computer program: the transceiver is configured to transmit and receive data under the control of the processor; and the processor is configured to read the computer program in the memory and perform the following operations of:

transmitting, by a target base station to which a target cell belongs, information associated with timing advance (TA) compensation used during UE performing uplink transmission in the target cell to a source base station to which a source cell belongs through an interface between network devices.

In an embodiment, the source cell or the target cell is any one of the following types of cells:

a terrestrial cell;

a satellite cell.

In an embodiment, the performing uplink transmission in the target cell is a first message for a random access procedure initiated by UE in the target cell or a first physical uplink shared channel (PUSCH) transmission performed by UE in the target cell.

In an embodiment, the interface between the network devices is:

an Xn interface between a source base station and a target base station; or a next generation (NG) interface between a target base station and a core network device; or an NG interface between the core network device and the source base station.

In an embodiment, the transmitting, by a target base station to which a target cell belongs, information associated with timing advance (TA) compensation used during UE performing uplink transmission in the target cell to a source base station to which a source cell belongs through an interface between network devices, includes:

transmitting the information associated with TA compensation to a source base station through the Xn interface after receiving a handover request for UE transmitted by the source base station through the Xn interface, in case that the interface between the network devices is an Xn interface; or receiving a handover request for the UE transmitted by a core network device, in case that the interface between the network devices is an NG interface, where the handover request is transmitted by the source base station to the core network device through the NG interface; and transmitting the information associated with TA compensation to the core network device for the core network device to transmit the information associated with TA compensation to the source base station through the NG interface.

In an embodiment, the information associated with TA compensation includes any one or more of the following items:

transmission delay of feeder links in the target cell;

a TA compensation value for the target cell; and ephemeris information;

location information of a reference point in the target cell and TA corresponding to the reference point in the target cell; and indication information of a cell type of the target cell, where the cell type is a terrestrial cell or a satellite cell.

In an embodiment, in case that the target cell is a terrestrial cell, the information associated with TA compensation includes any one or more of the following items:

a TA compensation value for the target cell; and indication information of a cell type of the target cell.

In an embodiment, in case that the target cell is a satellite cell and the satellite is a pass-through mode satellite, the operation further includes: compensating, by the target base station, transmission delay of feeder links.

An embodiment of the present application provides a terminal, including a memory, a transceiver, and a processor, where the memory is configured to store a computer program: the transceiver is configured to transmit and receive data under the control of the processor; and the processor is configured to read the computer program in the memory and perform the following operations of:

receiving information associated with timing advance (TA) compensation transmitted by a source base station to which a source cell, where the information associated with TA compensation is transmitted by a target base station to which a target cell belongs to a source base station to which a source cell belongs, through an interface between network devices; and performing uplink transmission based on the information associated with TA compensation.

In an embodiment, the source cell or the target cell is any one of the following types of cells:

a terrestrial cell;

a satellite cell.

In an embodiment, the uplink transmission is a first message for a random access procedure initiated by UE in the target cell or a first physical uplink shared channel (PUSCH) transmission performed by UE in the target cell.

In an embodiment, the interface between the network devices is:

an Xn interface between a source base station and a target base station; or a next generation (NG) interface between a target base station and a core network device; or an NG interface between the core network device and the source base station.

In an embodiment, the information associated with TA compensation includes any one or more of the following items:

transmission delay of feeder links in the target cell;

a TA compensation value for the target cell;

ephemeris information;

location information of a reference point in the target cell and TA corresponding to the reference point in the target cell; and indication information of a cell type of the target cell, where the cell type may be the terrestrial cell or the satellite cell.

In an embodiment, the performing uplink transmission based on the information associated with TA compensation includes:

determining, based on location information of UE, the ephemeris information and the transmission delay of feeder links in the target cell, a TA value used for performing uplink transmission in the target cell, in case that the information associated with TA compensation is the transmission delay of feeder links in the target cell;

determining the TA compensation value for the target cell as a TA value used for performing uplink transmission in the target cell, in case that the information associated with TA compensation is the TA compensation value for the target cell;

determining, based on UE location information and the ephemeris information, a TA value used for performing uplink transmission in the target cell, in case that the information associated with TA compensation is the ephemeris information;

calculating a difference between TA corresponding to the target cell and TA for the UE based on the UE location information and the location information of the reference point in the target cell, and determining a TA value used for performing uplink transmission in the target cell based on the difference and TA corresponding to the reference point in the target cell, in case that the information associated with TA compensation is location information of a reference point in the target cell and the TA corresponding to the reference point in the target cell;

determining that the target cell to be a terrestrial cell based on the indication information of a cell type of the target cell and determining a TA value used for performing uplink transmission in the target cell to be 0, in case that the information associated with TA compensation is the indication information of a cell type of the target cell; and performing uplink transmission in the target cell based on the TA value.

In an embodiment, the receiving information associated with TA compensation transmitted by a source base station to which a source cell, includes:

receiving a radio resource control (RRC) reconfiguration message transmitted by the source base station, where the RRC reconfiguration message includes the information associated with TA compensation.

An embodiment of the present application provides a base station, including a memory, a transceiver, and a processor, where the memory is configured to store a computer program: the transceiver is configured to transmit and receive data under the control of the processor; and the processor is configured to read the computer program in the memory and perform the following operations of:

obtaining information associated with TA compensation used during UE performing uplink transmission in the target cell, transmitted by a target base station to which a target cell belongs through the interface between network devices; and transmitting the information associated with TA compensation to the UE.

In an embodiment, the source cell or the target cell is any one of the following types of cells:

a terrestrial cell;

a satellite cell.

In an embodiment, the performing uplink transmission in the target cell is a first message for a random access procedure initiated by UE in the target cell or a first physical uplink shared channel (PUSCH) transmission performed by UE in the target cell.

In an embodiment, the interface between the network devices is:

an Xn interface between a source base station and a target base station; or a next generation (NG) interface between a target base station and a core network device; or an NG interface between the core network device and the source base station.

In an embodiment, the obtaining information associated with TA compensation used during UE performing uplink transmission in the target cell, transmitted by a target base station to which a target cell belongs through the interface between network devices, includes:

receiving information associated with TA compensation transmitted by the target base station through the Xn interface after transmitting a handover request for the UE to the target base station through the Xn interface, in case that the interface between the network devices is an Xn interface;

transmitting the handover request for the UE to a core network device through the NG interface for the target base station to transmit the information associated with TA compensation to the core network device after the handover request forwarded by the core network device is received, in case that the interface between the network devices is an NG interface; and receiving the information associated with TA compensation transmitted by the core network device through the NG interface.

In an embodiment, the information associated with TA compensation includes any one or more of the following items:

transmission delay of feeder links in the target cell;

a TA compensation value for the target cell;

ephemeris information;

location information of a reference point in the target cell and TA corresponding to the reference point in the target cell; and indication information of a cell type of the target cell, where the cell type is a terrestrial cell or a satellite cell.

In an embodiment, the transmitting the information associated with TA compensation to the UE includes:

transmitting a radio resource control (RRC) reconfiguration message to the UE, where the RRC reconfiguration message includes the information associated with TA compensation.

An embodiment of the present application provides a base station, including:

a first transmitting device, configured to transmit, by a target base station to which a target cell belongs, information associated with TA compensation used during UE performing uplink transmission in the target cell to a source base station to which a source cell belongs through an interface between network devices.

An embodiment of the present application provides a terminal, including:

a receiving device, configured to receive information associated with TA compensation transmitted by a source base station to which a source cell, where the information associated with TA compensation is transmitted by a target base station to which a target cell belongs to a source base station to which a source cell belongs, through an interface between network devices; and an uplink transmission device, configured to perform uplink transmission based on the information associated with TA compensation.

An embodiment of the present application provides a base station, including:

an obtaining device, configured to obtain information associated with TA compensation used during UE performing uplink transmission in the target cell, transmitted by a target base station to which a target cell belongs through the interface between network devices; and a second transmitting device, configured to transmit the information associated with TA compensation to the UE.

An embodiment of the present application provides a non-transitory computer-readable storage medium having a computer program stored thereon, where the computer program, when executed by a processor, causes the processor to perform steps of any one of the above-mentioned three methods for compensating timing advance.

In the methods for compensating timing advance according to the embodiments of the present application, by transmitting, to UE, the information associated with TA compensation used during UE performing uplink transmission in the target cell during cell handover procedure, UE may clearly and accurately determine the TA pre-compensation value used when UE is handed over to the target cell and the TA compensation is reasonably performed, which improves the rate of successful cell handover and reduces handover delay.

BRIEF DESCRIPTION OF THE DRAWINGS

In order to more clearly illustrate the solutions disclosed in the embodiments of the present application or the related art, the drawings used in the descriptions of the embodiments or the related art will be briefly described below. The drawings in the following description are only some embodiments of the present application.

FIG. 2 is a schematic flowchart of cell handover based on an NG interface according to an embodiment of the present application:

FIG. 3 is a schematic flowchart of a method for compensating timing advance according to a first embodiment of the present application;

FIG. 4 is a schematic flowchart of a method for compensating timing advance according to a second embodiment of the present application;

FIG. 5 is a schematic flowchart of a method for compensating timing advance according to a third embodiment of the present application;

FIG. 9 is a schematic flowchart of a method for compensating timing advance according to a seventh embodiment of the present application;

FIG. 10 is a schematic structural diagram of a base station according to an embodiment of the present application;

DETAILED DESCRIPTION

In the embodiments of the present application, the term "and/or" describes a related relationship of associated objects, and indicates that there may be three kinds of relationships. For example, A and/or B may represent that A exists alone, A and B exist simultaneously, and B exists alone. Character "/" generally indicates that the associated objects have an "or" relationship.

In the embodiments of the present application, the term "multiple" is two or more than two, and other quantifiers are similar.

The solutions in the embodiments of the present application are clearly and completely described in the following with reference to the accompanying drawings in the embodiments of the present application. These embodiments are only a part of the embodiments of the present application, and not all of the embodiments.

In the methods and devices for compensating timing advance according to the embodiments of the present application, it ensures that UE may clearly and accurately determine a TA pre-compensation value used when UE is handed over to the target cell and the TA compensation is reasonably performed during the cell handover procedure.

The methods and the apparatuses are based on the same disclosed concept, the implementation of the devices and the methods may be referred to each other since the principles of the methods and the apparatuses are similar, and the repetition will not be repeated.

Handover in the current terrestrial cellular network is mainly to provide continuous and stable services to UEs in a connected state. The main scenarios for handover are: handover based on UE mobility, and handover based on network load conditions. NR handover is divided into intra-base station (BS) handover, inter-BS handover, and inter-system handover. The inter-BS handover may be further divided into Xn-based handover and NG-based handover, which are described below.

Figure 1:
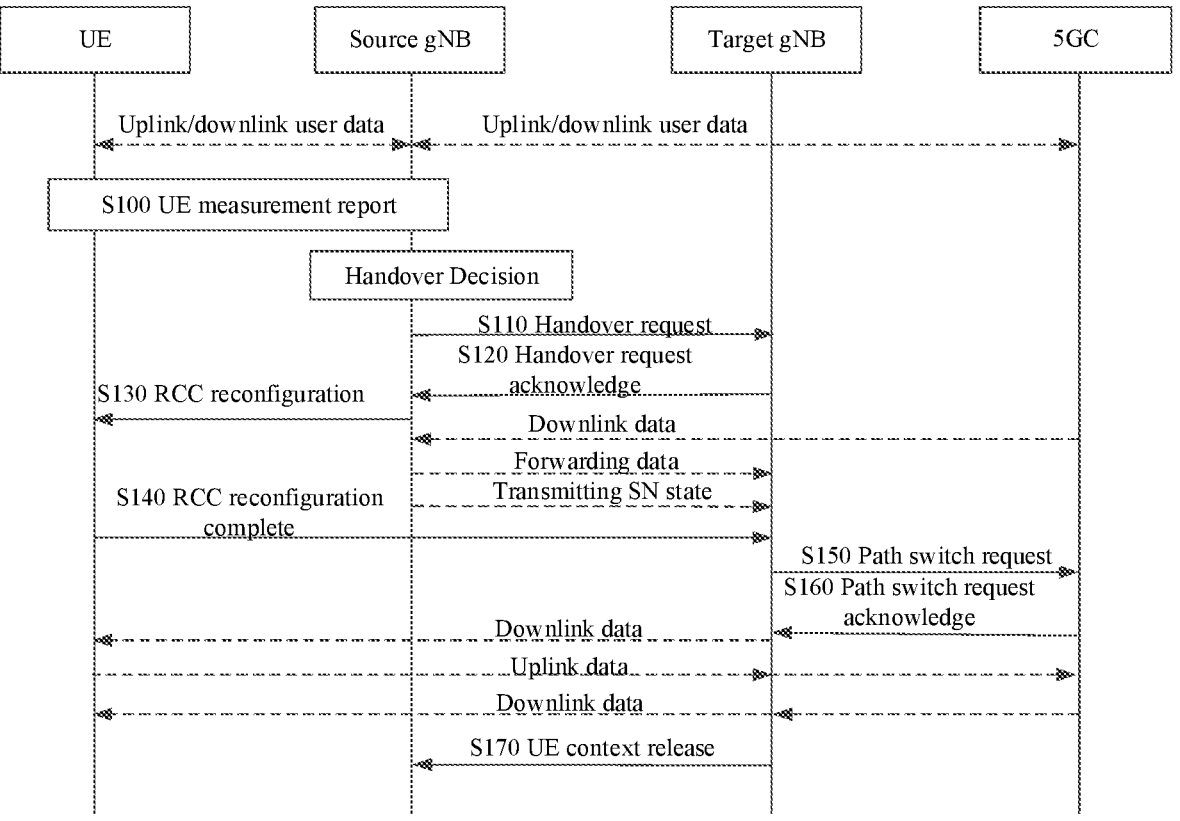
FIG. 1 is a schematic flowchart of cell handover based on an Xn interface according to an embodiment of the present application.

FIG. 1 is a schematic flowchart of cell handover based on an Xn interface according to an embodiment of the present application. As shown in FIG. 1, when available Xn interfaces exist between two base stations and the UE moves between the coverage of the two base stations, Xn handover may be adopted.

The following is specific description of each step.

Step 100, UE measurement report.

This step includes that the source base station to which a source cell belongs configures measurement configuration for the UE in the connected state. The UE performs measurement when it is determined that the measurement condition is satisfied; and the UE may report the measurement result to the source base station to which the source cell belongs through a measurement report message when the measurement report condition is satisfied.

Step 110, handover request.

The source base station to which the source cell belongs performs a handover decision. If handover is required, the source base station may transmit a handover request (HANDOVER REQUEST in the 5G system) message to the target base station to which a target cell belongs through the inter-BS interface (Xn interface in the 5G system).

Step 120, handover request acknowledge.

The target base station to which the target cell belongs performs an admission control after receiving the handover request transmitted by the source base station. If admission is possible, a handover command (the specific message in the 5G system is HANDOVER REQUEST ACKNOWL-EDGE) may be transmitted to the source cell.

Step 130, RRC reconfiguration.

After receiving the handover command from the target cell, the source cell may notify the UE of handover configuration information through a RRC reconfiguration procedure.

Step 140, RRC reconfiguration complete.

The UE notifies the target cell of the UE that the handover procedure has been completed by transmitting a RRC reconfiguration complete message to the target cell. The RRC reconfiguration complete message is transmitted by the following two schemes.

In case of random access channel-less (RACH-less) handover, the UE may directly transmit the RRC reconfiguration complete message using a PUSCH resource allocated by the target cell in the handover command, that is, a first uplink transmission performed by the UE in the target cell is PUSCH transmission.

In case of non-RACH-less handover, the UE is required to first initiate a random access procedure in the target cell to obtain the TA value and PUSCH resources and then transmits the RRC reconfiguration complete message, that is, the first uplink transmission performed by the UE in the target cell is random accessed Msg1 or MsgA.

Step 150, path switch request.

The target cell transmits a path switch request to a core network device to notify the core network device of performing data routing change.

Step 160, path switch request acknowledge.

After receiving the data routing change acknowledge message from the core network device, the target cell notifies the source cell of releasing UE context.

Step 170, UE context release.

After receiving the data routing change acknowledge message from the core network device, the target cell notifies the source cell of releasing UE context.

FIG. 2 is a schematic flowchart of cell handover based on an NG interface according to an embodiment of the present application. As shown in FIG. 2, when no available Xn interfaces exist between two base stations and the handover procedure may be completed over NG interfaces. The NG handover flow is described below.

Step 200, UE measurement report.

This step includes that the source base station to which the source cell belongs configures measurement configuration for the UE in the connected state. The UE performs measurement when it is determined that the measurement condition is satisfied; and the UE may report the measurement result to the source base station through a measurement report message when the measurement report condition is satisfied.

Step 210, handover preparation.

The source base station to which the source cell belongs performs a handover decision. If it is determined that handover is required, and no direct interface is available between the source base station to which the source cell belongs and the target base station to which the target cell belongs, the source base station may transmit a handover request message (the message transmitted between the source base station and the core network device in the 5G system is referred to as the handover preparation message: HANDOVER REQUIRED) through interfaces between the source base station and the core network device (NG interface in the 5G system).

Step 220, handover request.

After receiving the handover request transmitted by the source base station, the core network device may transmit a handover request to the target base station to which the target cell belongs (the HANDOVER REQUEST message is used in the 5G system)

Step 230, handover request acknowledge.

After receiving the handover request message transmitted by the core network device, the base station to which the target cell belongs may make an admission decision. If admission is possible, it will transmit, to the core network device, a handover request acknowledge message (the HANDOVER REQUEST ACKNOWLEDGE message is used in the 5G system)

Step 240, handover command.

The core network device transmits a handover command to the source base station (the specific message in the 5G system is HANDOVER REQUEST ACKNOWLEDGE).

Step 250, RRC reconfiguration.

After receiving the handover command from the target base station, the source base station may notify the UE of handover configuration information through a RRC reconfiguration procedure.

Step 260, RRC reconfiguration complete.

The UE notifies the target cell of the UE that the handover procedure has been completed by transmitting a RRC reconfiguration complete message to the target cell. The RRC reconfiguration complete message is transmitted by the following two schemes.

In case of RACH-less handover, the UE may directly transmit the RRC reconfiguration complete message using a PUSCH resource allocated by the target cell in the handover command, that is, a first uplink transmission performed by the UE in the target cell is PUSCH transmission.

In case of non-RACH-less handover, the UE is required to first initiate a random access procedure in the target cell to obtain the TA value and PUSCH resources and then transmits the RRC reconfiguration complete message, that is, the first uplink transmission performed by the UE in the target cell is random accessed Msg1 or MsgA.

Step 270, handover notification.

After the UE successfully accesses the target cell, the target cell is required to notify the core network device that the UE successfully accesses the target cell.

Step 280, UE context release.

The core network device notifies the source cell to release the context.

Step 290, UE context release complete.

The source cell responds an acknowledgment message to the core network device.

For the handover between different satellite cells, the handover between the satellite cell and the terrestrial cell, and the handover between different terrestrial cells, the TA pre-compensation value used by the UE in different cells may be different. Since no indication information associated with TA pre-compensation is carried in inter-BS interfaces during the traditional cell handover procedure, random access may fail due to unreasonable use of TA when the UE accesses the target cell, which reduces the rate of successful handover.

In the method for compensating timing advance according to the embodiments of the present application, the target base station to which the target cell belongs provides the UE with the information associated with TA compensation used during UE performing uplink transmission in the target cell during cell handover procedure, UE may clearly and accurately determine the TA pre-compensation value used when UE is handed over to the target cell and the TA compensation is reasonably performed, which improves the rate of successful cell handover and reduces handover delay.

FIG. 3 is a schematic flowchart of a method for compensating timing advance according to a first embodiment of the present application. As shown in FIG. 3, the method includes the following steps.

Step 300, transmitting, by a target base station to which a target cell belongs, information associated with timing advance (TA) compensation used during UE performing uplink transmission in the target cell to a source base station to which a source cell belongs through an interface between network devices.

One embodiment of the uplink transmission is that different UEs access in both time and frequency using an orthogonal multiple access scheme, that is, uplink transmissions from different UEs in the same cell do not interfere with each other. In order to ensure the orthogonality of uplink transmission and avoid intra-cell interference, the base station requires that times at which signals from different UEs in the same subframe but different frequency domain resources (different resource blocks (RB)) arrive at the base station are basically aligned. In order to ensure time synchronization on the base station side, an uplink timing advance mechanism is proposed. From the perspective of the UE side, the timing advance is essentially a negative offset between a start time of receiving the downlink subframe and the time of transmitting the uplink subframe. By properly controlling the offset of each UE, the time at which uplink signals from different UEs arrive at the base station may be controlled. A UE distal to the base station needs to transmit uplink data earlier than a UE proximal to the base station due to a large transmission delay.

However, when the UE is preparing to hand over to the target cell, the information associated with TA compensation used for the UE performing uplink transmission in the target cell is unknown. Therefore, when the UE performs cell handover, the target base station to which the target cell belongs may transmit, to the source base station to which the source cell belongs, information associated with TA compensation that may be used for the UE performing uplink transmission in the target cell through the network interface. After obtaining the information associated with TA compensation, the source base station to which the source cell belongs transmits the information associated with TA compensation to the UE during handover procedure of the UE from the source cell to the target cell. The UE may determine the TA value used for uplink transmission in the target cell based on the information associated with TA compensation, and perform uplink transmission based on the TA value, for example, performs the first uplink transmission based on the TA value.

In the methods for compensating timing advance according to the embodiments of the present application, by transmitting, to UE, the information associated with TA compensation used during UE performing uplink transmission in the target cell during cell handover procedure, UE may clearly and accurately determine the TA pre-compensation value used when UE is handed over to the target cell and the TA compensation is reasonably performed, which improves the rate of successful cell handover and reduces handover delay.

In various embodiments above, the source cell or the target cell is any one of the following types of cells:
a terrestrial cell;
a satellite cell.

In the present embodiment, the source cell may be a terrestrial cell or a satellite cell. Similarly, the target cell may also be a terrestrial cell or a satellite cell.

The applicable scenarios of the present embodiment may include, but not limited to: handing over a UE from one satellite cell to another satellite cell, handing over a UE from a terrestrial cell to a satellite cell, handing over a UE from a satellite cell to a terrestrial cell, and handing over a UE from one terrestrial cell to another terrestrial cell.

In various embodiments above, the performing uplink transmission in the target cell is a first message for a random access procedure initiated by a UE in the target cell or a first PUSCH transmission performed by a UE in the target cell.

When the UE is preparing to hand over to the target cell but has not yet successfully accessed, the information associated with TA compensation used for the UE performing uplink transmission in the target cell is unknown. However, the information associated with TA compensation used for uplink transmission after the successful access is adjusted based on an increment of the TA used for the UE performing the first transmission in the target cell. Therefore, in the present embodiment, the information associated with TA compensation used for the UE performing uplink transmission in the target cell may actually be regarded as the information associated with TA compensation used when the UE performs the first uplink transmission in the target cell. The first uplink transmission performed by the target cell may be a first message for the random access procedure initiated by the UE in the target cell or the first PUSCH transmission for the UE in the target cell.

In various embodiments above, the interface between the network devices is:
an Xn interface between a source base station and a target base station; or
a next generation (NG) interface between a target base station and a core network device; or
an NG interface between the core network device and the source base station.

The network interface may be one of the following items:
a direct interface between the source base station and the target base station (such as an Xn interface in the 5G system); or an interface between the target base station and the core network device and an interface between the network device and the source base station (such as the NG interface in the 5G system), which correspond to Xn-based handover and NG-based handover of the inter-BS handover respectively.

Therefore, in the present embodiment, regardless of whether a direct interface exists between the source base station and the target base station, the target base station to which the target cell belongs may transmit the information associated with TA compensation to the source base station, and the source cell may transmit the information associated with TA compensation to the UE to complete the uplink transmission.

In various embodiments above, the transmitting, by a target base station to which a target cell belongs, information associated with TA compensation used during UE performing uplink transmission in the target cell to a source base station to which a source cell belongs through an interface between network devices, includes:
transmitting the information associated with TA compensation to a source base station through the Xn interface after receiving a handover request for UE transmitted by the source base station through the Xn interface, in case that the interface between the network devices is an Xn interface.

In case that the interface between network devices is an Xn interface, that is, a direct interface exists between the source base station and the target base station, the target base station to which the target cell belongs may directly transmit the information associated with TA compensation used for the UE performing uplink transmission in the target cell to a source base station to which the source cell belongs through the Xn interface.

After determining that cell handover is required, the source base station will transmit a handover request message (HANDOVER REQUEST in the 5G system) to the target base station to which the target cell belongs through the Xn interface. After receiving the UE handover request transmitted by the source base station through the Xn interface, the target base station performs an admission decision, and if the UE is admissible, may directly transmit the information associated with TA compensation to the source base station to which the source cell belongs through the Xn interface. For example, a handover command (the specific message in the 5G system is HANDOVER REQUEST ACKNOWL-EDGE) is transmitted to the source base station, where the handover command carries information associated with TA compensation.

The target base station receives a handover request for the UE by a core network device, in case that the interface between the network devices is an NG interface, where the handover request is transmitted by the source base station to the core network device through the NG interface.

The target base station transmits the information associated with TA compensation to the core network device for the core network device to transmit the information associated with TA compensation to the source base station through the NG interface.

In case that the interface between network devices is an NG interface, that is, no direct interface exists between the source base station and the target base station, when the target base station transmits information associated with TA compensation to the source base station, the information associated with TA compensation needs to be forwarded to the core network device through the NG interface between the target base station and the core network device and then forwarded to the source base station by the core network device.

After the source base station determines that handover is required, and no direct interface is available between the source base station and the target base station, the source cell transmits a handover request message (the message transmitted between the source base station to which the source cell belongs and the core network device in the 5G system is referred to as the handover preparation message: HAN-DOVER REQUIRED) to the core network device through the interface (NG interface in the 5G system) between the source base station to which the source cell belongs and the core network device. After receiving the handover request transmitted by the source base station, the core network device transmits a handover request (the HANDOVER REQUEST message is used in the 5G system) to the target base station to which the target cell belongs. After receiving the UE handover request transmitted by the core network device, the target base station to which the target cell belongs performs an admission decision. If the UE is admissible, the information associated with TA compensation may be transmitted to the core network device. For example, a handover request acknowledge message (the HANDOVER REQUEST ACKNOWLEDGE message is used in the 5G system) is transmitted to the core network device where the handover acknowledge message carries information associated with TA compensation. After receiving it, the core network device forwards the information associated with TA compensation to the source base station to which the source cell belongs through the NG interface between it and the source base station to which the source cell belongs. For example, the core network device transmits a handover command (the specific message in the 5G system is HAN-DOVER REQUEST ACKNOWLEDGE) to the source base station, the handover command carries information associated with TA compensation.

In various embodiments above, the information associated with TA compensation includes any one or more of the following items:

transmission delay of feeder links in the target cell;
a TA compensation value for the target cell;
ephemeris information;
location information of a reference point in the target cell and TA corresponding to the reference point in the target cell; and
indication information of a cell type of the target cell, where the cell type is a terrestrial cell or a satellite cell.

In an embodiment, the information associated with TA compensation may be any one or more of the following items:

transmission delay of feeder links in the target cell;
a TA compensation value for the target cell;
ephemeris information;
location information of a reference point in the target cell and TA corresponding to the reference point in the target cell; and
indication information of a cell type of the target cell, where the cell type is a terrestrial cell or a satellite cell.

After the target base station to which the target cell belongs provides the information associated with TA compensation to the UE, the UE may determine a TA value used for performing uplink transmission in the target cell in different ways based on different information associated with TA compensation and perform uplink transmission based on the TA value.

In various embodiments above, in case that the target cell is a terrestrial cell, the information associated with TA compensation includes any one or more of the following items:

a TA compensation value for the target cell; and
indication information of a cell type of the target cell.

If the target cell is a terrestrial cell, when calculating the TA compensation, factors that may be referred to are the TA compensation value for the target cell and/or indication information on the cell type of the target cell.

In an embodiment, in case that the target cell is a satellite cell and the satellite is a pass-through mode satellite, the method further includes: compensating, by the target base station to which the target cell belongs, transmission delay of feeder links.

In the present embodiment, regardless of the type of information associated with TA compensation, if the target cell is a satellite cell and the satellite is a pass-through mode satellite, the target base station may self-compensate the transmission delay of the feeder links when the UE performs the first uplink transmission.

FIG. 4 is a schematic flowchart of a method for compensating timing advance according to a second embodiment of the present application. As shown in FIG. 4, the method includes the following steps.

Step 400, receiving information associated with timing advance (TA) compensation transmitted by a source base station to which a source cell, where the information associated with TA compensation is transmitted by a target base station to which a target cell belongs to a source base station to which a source cell belongs, through an interface between network devices.

When the UE is preparing to hand over to the target cell, the information associated with TA compensation used for the UE performing uplink transmission in the target cell is unknown. Therefore, when performing cell handover, the UE may receive the information associated with TA compensation transmitted by the source cell. The information associated with TA compensation is transmitted by a target base station to which a target cell belongs to a source base station to which a source cell belongs, through an interface between network devices;

The target base station to which a target cell belongs transmits the information associated with TA compensation used for uplink transmission in the target cell to the source base station to which the source cell belongs through the network interface, and after obtaining the information associated with TA compensation, the source base station to which the source cell belongs transmits the information associated with TA compensation to the UE during handover procedure of the UE from the source cell to the target cell. For example, the information associated with TA compensation is transmitted to the UE through RRC reconfiguration signaling.

Step 410, performing uplink transmission based on the information associated with TA compensation.

After receiving the information associated with TA compensation transmitted by the source cell, the UE may determine a TA value used for uplink transmission in the target cell based on the information associated with TA compensation, and perform uplink transmission based on the TA value, for example, perform the first uplink transmission based on the TA value.

In the methods for compensating timing advance according to the embodiments of the present application, by receiving the information associated with TA compensation used during UE performing uplink transmission in the target cell, provided by the target base station during cell handover, UE may clearly and accurately determine the TA pre-compensation value used when UE is handed over to the target cell and the TA compensation is reasonably performed, which improves the rate of successful cell handover and reduces handover delay.

In various embodiments above, the source cell or the target cell is any one of the following types of cells:
  a terrestrial cell;
  a satellite cell.

In the embodiment, the source cell may be a terrestrial cell or a satellite cell. Similarly, the target cell may also be a terrestrial cell or a satellite cell.

The applicable scenarios of the present embodiment may include, but not limited to: handing over a UE from one satellite cell to another satellite cell, handing over a UE from a terrestrial cell to a satellite cell, handing over a UE from a satellite cell to a terrestrial cell, and handing over a UE from one terrestrial cell to another terrestrial cell.

In various embodiments above, the performing uplink transmission is a first message for a random access procedure initiated by a UE in the target cell or a first PUSCH transmission performed by a UE in the target cell.

When the UE is preparing to hand over to the target cell but has not yet successfully accessed, the information associated with TA compensation used for the UE performing uplink transmission in the target cell is unknown. However, the information associated with TA compensation used for uplink transmission after the successful access is adjusted based on an increment of the TA used for the UE performing the first transmission in the target cell. Therefore, in the present embodiment, the information associated with TA compensation used for the UE performing uplink transmission in the target cell may actually be regarded as the information associated with TA compensation used when the UE performs the first uplink transmission in the target cell. The first uplink transmission of the target cell may be a first message for the random access procedure initiated by the UE in the target cell or the first PUSCH transmission for the UE in the target cell.

In various embodiments above, the interface between the network devices is:
  an Xn interface between a source base station and a target base station; or
  a next generation (NG) interface between a target base station and a core network device; or
  an NG interface between the core network device and the source base station.

The network interface may be one of the following items:
  a direct interface between the source base station and the target base station (such as an Xn interface in the 5G system); or an interface between the target base station and the core network device and an interface between the network device and the source base station (such as the NG interface in the 5G system), which corresponding to Xn-based handover and NG-based handover of the inter-BS handover respectively.

Therefore, in the present embodiment, whether a direct interface exists between the source base station and the target base station, the UE may obtain the information associated with TA compensation provided by the target base station whether a direct interface exists between the source base station and the target base station. That is, the procedures of transmitting the information associated with TA compensation by the target base station to the source base station and transmitting the information associated with TA compensation by the source cell to the UE may be realized.

In various embodiments above, the information associated with TA compensation includes any one or more of the following items:
  transmission delay of feeder links in the target cell;
  a TA compensation value for the target cell;
  ephemeris information;
  location information of a reference point in the target cell and TA corresponding to the reference point in the target cell; and
  indication information of a cell type of the target cell, where the cell type may be the terrestrial cell or the satellite cell.

In an embodiment, the information associated with TA compensation may be any one or more of the following items:
  transmission delay of feeder links in the target cell;
  a TA compensation value for the target cell;
  ephemeris information;
  location information of a reference point in the target cell and TA corresponding to the reference point in the target cell; and
  indication information of a cell type of the target cell, where the cell type is a terrestrial cell or a satellite cell.

For example, the information associated with TA compensation may be a combination of the transmission delay of the feeder links in the target cell and ephemeris information, and the UE may determine the TA value used for performing uplink transmission in the target cell based on this combination of information.

In various embodiments above, the performing uplink transmission based on the information associated with TA compensation includes:

determining, based on location information of UE, the ephemeris information and the transmission delay of feeder links in the target cell, a TA value used for performing uplink transmission in the target cell, in case that the information associated with TA compensation is the transmission delay of feeder links in the target cell;

determining the TA compensation value for the target cell as a TA value used for performing uplink transmission in the target cell, in case that the information associated with TA compensation is the TA compensation value for the target cell;

determining, based on UE location information and the ephemeris information, a TA value used for performing uplink transmission in the target cell, in case that the information associated with TA compensation is the ephemeris information;

calculating a difference between TA corresponding to the target cell and TA for the UE based on the UE location information and the location information of the reference point in the target cell, and determining a TA value used for performing uplink transmission in the target cell based on the difference and TA corresponding to the reference point in the target cell, in case that the information associated with TA compensation is location information of a reference point in the target cell and the TA corresponding to the reference point in the target cell;

determining that the target cell to be a terrestrial cell based on the indication information of a cell type of the target cell and determining a TA value used for performing uplink transmission in the target cell to be 0, in case that the information associated with TA compensation is the indication information of a cell type of the target cell; and performing uplink transmission in the target cell based on the TA value.

After receiving the information associated with TA compensation, the UE may determine the TA value used for performing the first uplink transmission in the target cell based on the TA related compensation information. The uplink transmission may be: random access message1 (Msg1) or messageA (MsgA) or PUSCH transmission.

After the target base station to which the target cell belongs provides the information associated with TA compensation to the UE, the UE may determine a TA value used for performing uplink transmission in the target cell in different ways based on different information associated with TA compensation and perform uplink transmission based on the TA value.

The UE may determine, based on all of location information of UE, the ephemeris information and the transmission delay of feeder links in the target cell, a TA value used for performing uplink transmission in the target cell in case that the information associated with TA compensation is "the transmission delay of feeder links in the target cell": where the ephemeris information used by the UE may be pre-stored by the UE, or provided by the target base station to which the target cell belongs.

The UE may directly determine the TA compensation value for the target cell as a TA value used for performing uplink transmission in the target cell in case that the information associated with TA compensation is "the TA compensation value for the target cell".

The UE may determine, based on UE location information and the ephemeris information, a TA value used for performing uplink transmission in the target cell in case that the information associated with TA compensation is the "ephemeris information": where the transmission delay of the feeder links is compensated by the satellite.

The UE may determine a difference (delta) between TA corresponding to the target cell the target cell and TA for the UE based on the UE location information and the location information of the reference point in the target cell, calculate a sum of the TA corresponding to the target cell and delta as TAI, and determine a value of TAI as a TA value used for performing uplink transmission in the target cell, in case that the information associated with TA compensation is location information of a reference point in the target cell and TA corresponding to the reference point in the target cell.

The UE may determine a TA value used for performing uplink transmission in the target cell to be 0 when it determines that the target cell is a terrestrial network (TN) cell, in case that the information associated with TA compensation is the indication information of a cell type of the target cell.

In various embodiments above, the receiving information associated with TA compensation transmitted by a source base station to which a source cell, includes:

receiving a radio resource control (RRC) reconfiguration message transmitted by the source base station, where the RRC reconfiguration message includes the information associated with TA compensation.

After receiving the handover command transmitted by the target base station to which the target cell belongs, the source base station to which the source cell belongs may notify the UE of the handover configuration information through the RRC reconfiguration message, where the RRC reconfiguration message includes the information associated with TA compensation for the UE is in the target cell.

In the methods for compensating timing advance according to the embodiments of the present application, by receiving the information associated with TA compensation used during UE performing uplink transmission in the target cell, provided by the target base station to which the target cell belongs during cell handover, UE may clearly and accurately determine the TA pre-compensation value used when UE is handed over to the target cell and the TA compensation is reasonably performed, which improves the rate of successful cell handover and reduces handover delay.

FIG. 5 is a schematic flowchart of a method for compensating timing advance according to a third embodiment of the present application. As shown in FIG. 5, the method includes the following steps.

Step 500, obtaining information associated with TA compensation used during UE performing uplink transmission in the target cell, transmitted by a target base station to which a target cell belongs through the interface between network devices;

When the UE is preparing to hand over from the source cell to the target cell, the information associated with TA compensation used for the UE performing uplink transmission in the target cell is unknown. Therefore, the source base station to which the source cell belongs may obtain the information associated with TA compensation used for the UE performing uplink transmission in the target cell, transmitted by the target base station to which the target cell through the interface between network devices, provide the information associated with TA compensation to the UE and the UE completes the uplink transmission based on the information associated with TA compensation.

When the UE performs cell handover, the target base station to which the target cell belongs transmits information associated with TA compensation used for the UE performing uplink transmission in the target cell to the source base station to which the source cell belongs through the network interface and the source base station to which the source cell belongs obtains the information associated with TA compensation.

Step 510, transmitting the information associated with TA compensation to the UE.

After obtaining the information associated with TA compensation, the source base station to which the source cell belongs may transmit the information associated with TA compensation to the UE during the handover procedure of the UE from the source cell to the target cell, and the UE may determine a TA value used for performing uplink transmission in the target cell based on the information associated with TA compensation and perform the uplink transmission based on the TA value, for example, perform the first uplink transmission based on the TA value.

In the methods for compensating timing advance according to the embodiments of the present application, by receiving the information associated with TA compensation used during UE performing uplink transmission in the target cell, provided by the target base station during cell handover of UE and transmitting the information to the UE, UE may clearly and accurately determine the TA pre-compensation value used when UE is handed over to the target cell and the TA compensation is reasonably performed, which improves the rate of successful cell handover and reduces handover delay.

In various embodiments above, the source cell or the target cell is any one of the following types of cells:

a terrestrial cell;

a satellite cell.

In the embodiment, the source cell may be a terrestrial cell or a satellite cell. Similarly, the target cell may also be a terrestrial cell or a satellite cell.

The applicable scenarios of the present embodiment may include, but not limited to: handing over a UE from one satellite cell to another satellite cell, handing over a UE from a terrestrial cell to a satellite cell, handing over a UE from a satellite cell to a terrestrial cell, and handing over a UE from one terrestrial cell to another terrestrial cell.

In various embodiments above, the performing uplink transmission in the target cell is a first message for a random access procedure initiated by a UE in the target cell or a first PUSCH transmission performed by a UE in the target cell.

When the UE is preparing to hand over to the target cell but has not yet successfully accessed, the information associated with TA compensation used for the UE performing uplink transmission in the target cell is unknown. However, the information associated with TA compensation used for uplink transmission after the successful access is adjusted based on an increment of the TA used for the UE performing the first transmission in the target cell. Therefore, in the present embodiment, the information associated with TA compensation used for the UE performing uplink transmission in the target cell may actually be regarded as the information associated with TA compensation used when the UE performs the first uplink transmission in the target cell. The first uplink transmission performed by the target cell may be a first message for the random access procedure initiated by the UE in the target cell or the first PUSCH transmission for the UE in the target cell.

In various embodiments above, the interface between the network devices is:

an Xn interface between a source base station and a target base station; or a next generation (NG) interface between a target base station and a core network device; or an NG interface between the core network device and the source base station.

The network interface may be one of the following items:

a direct interface between the source base station and the target base station (such as an Xn interface in the 5G system); or an interface between the target base station and the core network device and an interface between the network device and the source base station (such as the NG interface in the 5G system), which correspond to Xn-based handover and NG-based handover of the inter-BS handover respectively.

Therefore, in the present embodiment, regardless of whether a direct interface exists between the source base station and the target base station, the target base station may transmit the information associated with TA compensation to the source base station, and the source cell may transmit the information associated with TA compensation to the UE.

In various embodiments above, the obtaining information associated with TA compensation used during UE performing uplink transmission in the target cell, transmitted by a target base station to which a target cell belongs through the interface between network devices, includes:

receiving information associated with TA compensation transmitted by the target base station through the Xn interface after transmitting a handover request for the UE to the target base station through the Xn interface, in case that the interface between the network devices is an Xn interface.

In case that the interface between network devices is an Xn interface, that is, a direct interface exists between the source base station and the target base station, the source base station to which the source cell belongs may directly obtain the information associated with TA compensation used for the UE performing uplink transmission in the target cell from the target base station to which the target cell belongs through the Xn interface; that is, the target base station may transmit directly the information associated with TA compensation to the source base station to which the source cell belongs through the Xn interface.

After determining that cell handover is required, the source base station will transmit a handover request message (HANDOVER REQUEST in the 5G system) to the target base station to which the target cell belongs through the Xn interface. After receiving the UE handover request transmitted by the source base station through the Xn interface, the target base station performs an admission decision, and if the UE is admissible, may directly transmit the information associated with TA compensation to the source base station to which the source cell belongs through the Xn interface. For example, transmit a handover command (the specific message in the 5G system is HANDOVER REQUEST ACKNOWLEDGE) is transmitted to the source base station, where the handover command carries information associated with TA compensation.

The handover request for the UE is transmitted to a core network device through the NG interface and the target base station transmits the information associated with TA compensation to the core network device after the handover request forwarded by the core network device is received, in case that the interface between the network devices is an NG interface.

The information associated with TA compensation transmitted by the core network device is received through the NG interface.

In case that the interface between network devices is an NG interface, that is, no direct interface exists between the source base station and the target base station, when the target base station to which the target cell belongs transmits information associated with TA compensation to the source base station, the information associated with TA compensation needs to be forwarded to the source base station through the NG interface between the target base station and the core network device.

After the source base station to which the source cell belongs determines that handover is required, and no direct interface is available between the source base station and the target base station, the source cell transmits a handover request message (the message transmitted between the source cell and the core network device in the 5G system is referred to as the handover preparation message: HANDOVER REQUIRED) to the core network device through the interface (NG interface in the 5G system) between the source base station and the core network device. After receiving the handover request transmitted by the source base station to which the source cell belongs, the core network device transmits a handover request (the HANDOVER REQUEST message is used in the 5G system) to the target base station to which the target cell belongs. After receiving the UE handover request transmitted by the core network device, the target base station performs an admission decision. If the UE is admissible, the information associated with TA compensation may be transmitted to the core network device. For example, a handover request acknowledge message (the HANDOVER REQUEST ACKNOWLEDGE message ia used in the 5G system) is transmitted to the core network device where the handover acknowledge message carries information associated with TA compensation. After receiving it, the core network device forwards the information associated with TA compensation to the source base station to which the source cell belongs through the NG interface between it and the source base station to which the source cell belongs. For example, the core network device transmits a handover command (the specific message in the 5G system is HANDOVER REQUEST ACKNOWLEDGE) to the source base station, the handover command carries information associated with TA compensation.

In various embodiments above, the information associated with TA compensation includes any one or more of the following items:

transmission delay of feeder links in the target cell;
a TA compensation value for the target cell;
ephemeris information;
location information of a reference point in the target cell and TA corresponding to the reference point in the target cell; and
indication information of a cell type of the target cell, where the cell type is a terrestrial cell or a satellite cell.

In an embodiment, the information associated with TA compensation may be any one or more of the following items:

transmission delay of feeder links in the target cell;
a TA compensation value for the target cell;
ephemeris information;

location information of a reference point in the target cell and TA corresponding to the reference point in the target cell; and
indication information of a cell type of the target cell, where the cell type is a terrestrial cell or a satellite cell.

It may be understood that after the source base station to which the source cell belongs transmits the information associated with TA compensation obtained from the target base station to which the target cell belongs to the UE, the UE may determine a TA value used for performing uplink transmission in the target cell in different ways based on different information associated with TA compensation and perform uplink transmission based on the TA value.

In various embodiments above, the transmitting the information associated with TA compensation to the UE includes:

transmitting a RRC reconfiguration message to the UE, where the RRC reconfiguration message includes the information associated with TA compensation.

After receiving the handover command transmitted by the target base station, the source base station to which the source cell belongs may notify the UE of the handover configuration information through the RRC reconfiguration message, where the RRC reconfiguration message includes the information associated with TA compensation for the UE is in the target cell.

In the methods for compensating timing advance according to the embodiments of the present application, by receiving the information associated with TA compensation used during UE performing uplink transmission in the target cell, provided by the target base station during cell handover of UE and transmitting the information to the UE, UE may clearly and accurately determine the TA pre-compensation value used when UE is handed over to the target cell and the TA compensation is reasonably performed, which improves the rate of successful cell handover and reduces handover delay.

Figure 6:
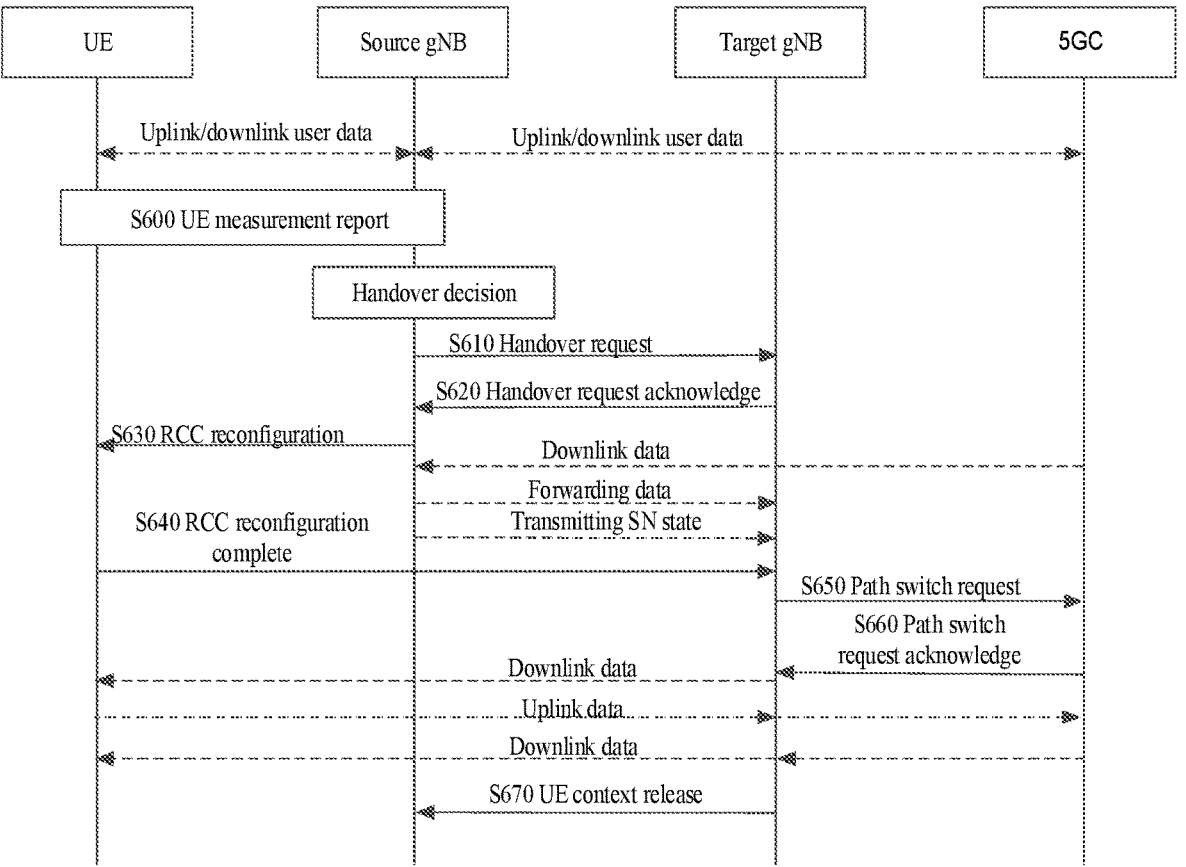
FIG. 6 is a schematic flowchart of a method for compensating timing advance according to a fourth embodiment of the present application.

FIG. 6 is a schematic flowchart of a method for compensating timing advance according to a fourth embodiment of the present application. The applicable scenarios of the embodiment of the present application include but not limited to: handing over a UE from a satellite cell to another satellite cell, and handing over a UE from a terrestrial cell to a satellite cell. As shown in FIG. 6, the method includes the following steps.

Step 600, UE measurement report.

In an embodiment, the source base station to which the source cell belongs configures measurement configuration for the UE in the connected state. The UE performs measurement when the measurement condition is satisfied; and the UE reports the measurement result to the source base station through a measurement report message when the measurement report condition is satisfied.

Step 610, handover request.

In an embodiment, the source base station to which the source cell belongs performs a handover decision. If handover is required, the source base station serving the UE will transmit a handover request (HANDOVER REQUEST in the 5G system) message to the target base station to which a target cell belongs through the inter-BS interface (Xn interface in the 5G system).

Step 620, handover request acknowledge.

In an embodiment, the target base station to which the target cell belongs performs an admission control after receiving the handover request transmitted by the source base station to which the source cell. If admission is possible, a handover command (the specific message in the 5G system is HANDOVER REQUEST ACKNOWLEDGE) may be transmitted to the source base station.

The handover command needs to carry the information associated with TA compensation used for the UE performing uplink transmission in the target cell, and the information associated with TA compensation used for the UE performing uplink transmission in the target cell may include one or more of the following items:

transmission delay of feeder links in the target cell;

a TA compensation value for the target cell;

ephemeris information;

location information of a reference point in the target cell and TA corresponding to the reference point in the target cell; and indication information of a cell type of the target cell, where the cell type is a terrestrial cell or a satellite cell.

Step 630, RRC reconfiguration.

In an embodiment, after receiving the handover command from the target base station, the source base station to which the source cell notifies the UE of handover configuration information through a RRC reconfiguration procedure. The RRC reconfiguration message needs to include at least the information associated with TA compensation in step 620.

Step 640, RRC reconfiguration complete.

In an embodiment, the UE notifies the target cell of the UE that the handover procedure has been completed by transmitting a RRC reconfiguration complete message to the target cell. The RRC reconfiguration complete message is transmitted by the following two schemes.

In case of RACH-less handover, the UE may directly transmit the RRC reconfiguration complete message using a PUSCH resource allocated by the target cell in the handover command, that is, a first uplink transmission performed by the UE in the target cell is PUSCH transmission.

In case of non-RACH-less handover, the UE is required to first initiate a random access procedure in the target cell to obtain the TA value and PUSCH resources, and then transmits the RRC reconfiguration complete message, that is, the first uplink transmission performed by the UE in the target cell is random accessed Msg1 or MsgA.

In the present embodiment, when the UE transmits the RRC reconfiguration complete message, regardless of RACH-less handover or non-RACH-less handover, the UE may obtain information associated with TA compensation through solutions according to the embodiment of the present application.

In the present embodiment, after receiving the information associated with TA compensation, the UE may determine the TA value used for performing the first uplink transmission in the target cell based on the TA related compensation information. The uplink transmission may be: random access Msg1 or MsgA or PUSCH transmission.

The schemes in which the UE determines the TA value used for the UE performing the first uplink transmission in the target cell based on the information associated with TA compensation may be, but not limited to, any one or more of the following items.

The UE may determine, based on all of location information of UE, the ephemeris information and the transmission delay of feeder links in the target cell, a TA value used for performing uplink transmission in the target cell in case that the information associated with TA compensation is "the transmission delay of feeder links in the target cell": where the ephemeris information used by the UE may be pre-stored by the UE.

The UE may directly determine the TA compensation value for the target cell as a TA value used for performing uplink transmission in the target cell in case that the information associated with TA compensation is "the TA compensation value for the target cell".

The UE may determine, based on UE location information and the ephemeris information, a TA value used for performing uplink transmission in the target cell in case that the information associated with TA compensation is the "ephemeris information": where the transmission delay of the feeder links is compensated by the satellite.

The UE may determine a difference delta between TA corresponding to the target cell and TA for the UE based on the UE location information and the location information of the reference point in the target cell, calculate a sum of the TA corresponding to the target cell and difference delta as TAI and determine a value of TAI as a TA value used for performing uplink transmission in the target cell, in case that the information associated with TA compensation is location information of a reference point in the target cell and TA corresponding to the reference point in the target cell.

The UE may determine a TA value used for performing uplink transmission in the target cell to be 0 when it is determined that the target cell is a terrestrial cell based on the indication information of a cell type of the target cell, in case that the information associated with TA compensation is the indication information of a cell type of the target cell.

Step 650, path switch request.

In an embodiment, the target cell transmits a path switch request to a core network device to notify the core network device of performing data routing change.

Step 660, path switch request acknowledge.

In an embodiment, the core network device transmits a path switch acknowledge message to the target cell.

Step 670, UE context release.

In an embodiment, after receiving the data routing change acknowledge message from the core network device, the target cell notifies the source cell of releasing UE context.

Figure 7:
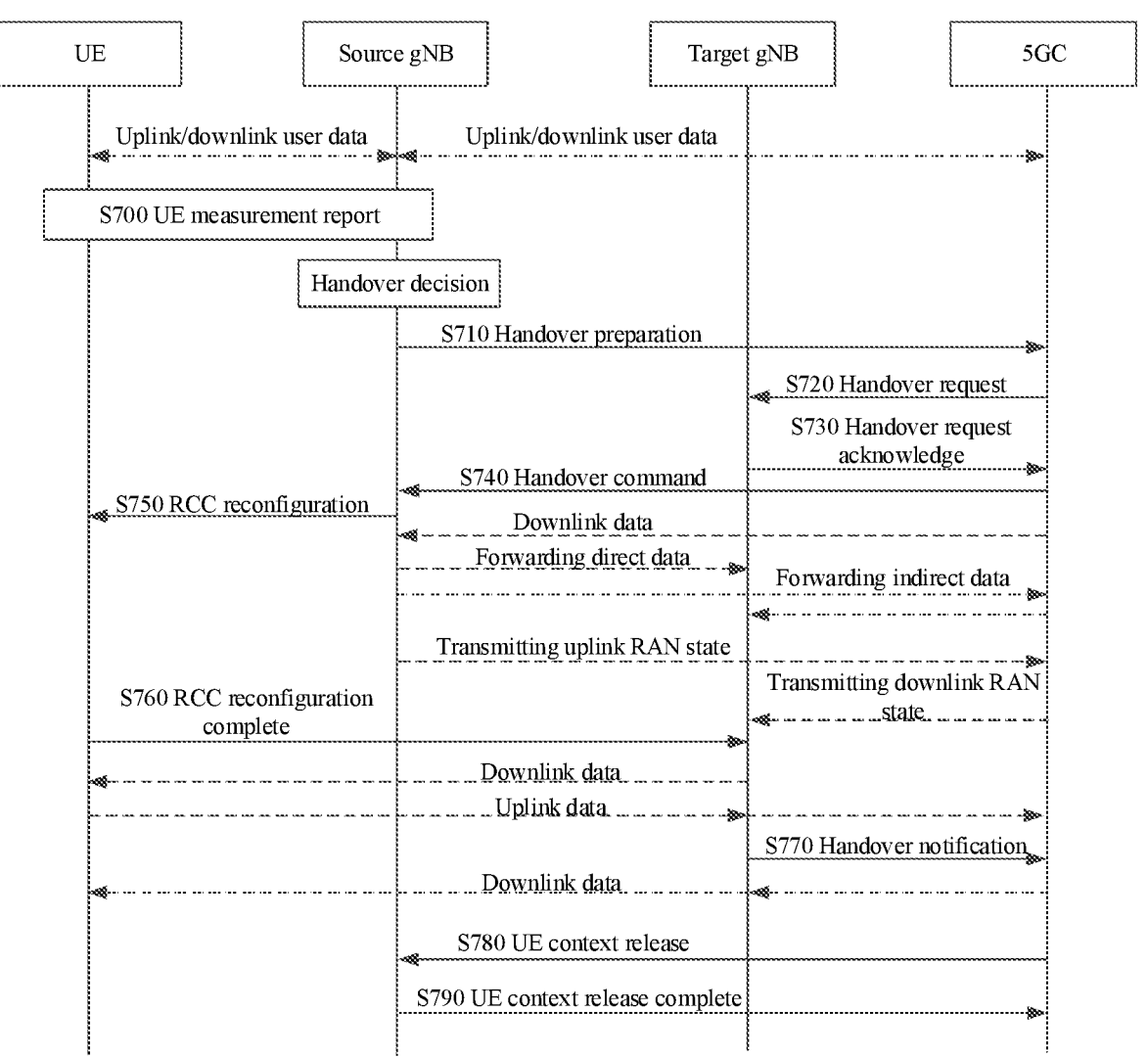
FIG. 7 is a schematic flowchart of a method for compensating timing advance according to a fifth embodiment of the present application.

FIG. 7 is a schematic flowchart of a method for compensating timing advance according to a fifth embodiment of the present application. The applicable scenarios of the embodiment of the present application include but not limited to: handing over a UE from a satellite cell to another satellite cell, and handing over a UE from a terrestrial cell to a satellite cell. As shown in FIG. 7, the method includes the following steps.

Step 700, UE measurement report.

In an embodiment, the source base station to which the source cell belongs configures measurement configuration for the UE in the connected state. The UE performs measurement when the measurement condition is satisfied; and the UE reports the measurement result to the source base station through a measurement report message when the measurement report condition is satisfied.

Step 710, handover preparation.

In an embodiment, the source base station to which the source cell belongs performs a handover decision, if the performance of handover is required, and no direct interface is available between the source base station and the target base station, the source base station to which the source cell belongs transmits a handover request message (the message transmitted between the source cell and the core network device in the 5G system is referred to as the handover preparation message: HANDOVER REQUIRED) to the core network device through the interface (NG interface in the 5G system) between the source base station and the core network device.

Step 720, handover request.

In an embodiment, after receiving the handover request for the UE transmitted by the source base station to which the source cell, the core network device transmits a handover request (the HANDOVER REQUEST message is used in the 5G system) to the target base station.

Step 730, handover request acknowledge.

In an embodiment, the target base station to which the target cell belongs performs an admission control after receiving the handover request transmitted by the core network device through NF interface. If the admission is possible, a handover request acknowledge message (the HANDOVER REQUEST ACKNOWLEDGE message is used in the 5G system) is transmitted to the core network device.

The handover request acknowledge message needs to carry the information associated with TA compensation used for the UE performing uplink transmission in the target cell, and the information associated with TA compensation used for the UE performing uplink transmission in the target cell may include one or more of the following items: transmission delay of feeder links in the target cell;

a TA compensation value for the target cell;

ephemeris information;

location information of a reference point in the target cell and TA corresponding to the reference point in the target cell; and indication information of a cell type of the target cell, where the cell type is a terrestrial cell or a satellite cell.

Step 740, handover command.

In an embodiment, the core network device transmits a handover command to the source base station to which the source cell belongs (the specific message in the 5G system is HANDOVER REQUEST ACKNOWLEDGE).

In an embodiment, the handover command may carry information associated with TA compensation used for the UE performing uplink transmission in the target cell.

Step 750, RRC reconfiguration.

In an embodiment, after receiving the handover command from the target base station to which the target cell belongs, the source base station to which the source cell notifies the UE of handover configuration information through a RRC reconfiguration procedure. The RRC reconfiguration message needs to include at least the information associated with TA compensation in step 740.

Step 760, RRC reconfiguration complete.

In an embodiment, the UE notifies the target cell of the UE that the handover procedure has been completed by transmitting a RRC reconfiguration complete message to the target cell. The RRC reconfiguration complete message is transmitted by the following two schemes.

In case of RACH-less handover, the UE may directly transmit the RRC reconfiguration complete message using a PUSCH resource allocated by the target cell in the handover command, that is, a first uplink transmission performed by the UE in the target cell is PUSCH transmission.

In case of non-RACH-less handover, the UE is required to first initiate a random access procedure in the target cell to obtain the TA value and PUSCH resources and then transmits the RRC reconfiguration complete message, that is, the first uplink transmission performed by the UE in the target cell is random accessed Msg1 or MsgA.

In the present embodiment, after receiving the information associated with TA compensation, the UE may determine the TA value used for performing the first uplink transmission in the target cell based on the TA related compensation information. The uplink transmission may be: random access Msg1 or MsgA or PUSCH transmission.

The schemes in which the UE determines the TA value used for the UE performing the first uplink transmission in the target cell based on the information associated with TA compensation may be, but not limited to, any one or more of the following items.

The UE may determine, based on all of location information of UE, the ephemeris information and the transmission delay of feeder links in the target cell, a TA value used for performing uplink transmission in the target cell in case that the information associated with TA compensation is "the transmission delay of feeder links in the target cell": where the ephemeris information used by the UE may be pre-stored by the UE.

The UE may directly determine the TA compensation value for the target cell as a TA value used for performing uplink transmission in the target cell in case that the information associated with TA compensation is "the TA compensation value for the target cell".

The UE may determine, based on UE location information and the ephemeris information, a TA value used for performing uplink transmission in the target cell in case that the information associated with TA compensation is the "ephemeris information": where the transmission delay of the feeder links is compensated by the satellite.

The UE may determine a difference (delta) between TA corresponding to the target cell and TA for the UE based on the UE location information and the location information of the reference point in the target cell, calculate a sum of the TA corresponding to the target cell and delta as TAI, and determine a value of TAI as a TA value used for performing uplink transmission in the target cell, in case that the information associated with TA compensation is location information of a reference point in the target cell and TA corresponding to the reference point in the target cell.

The UE may determine a TA value used for performing uplink transmission in the target cell to be 0 when it determines that the target cell is a TN cell, in case that the information associated with TA compensation is the indication information of a cell type of the target cell.

Step 770, handover notification.

In an embodiment, after the UE successfully accesses the target cell, the target cell is required to notify the core network device that the UE successfully accesses the target cell.

Step 780, UE context release.

In an embodiment, the core network device notifies the source cell to release the context.

Step 790, UE context release complete.

In an embodiment, the source cell responds an acknowledgment message to the core network device.

Figure 8:
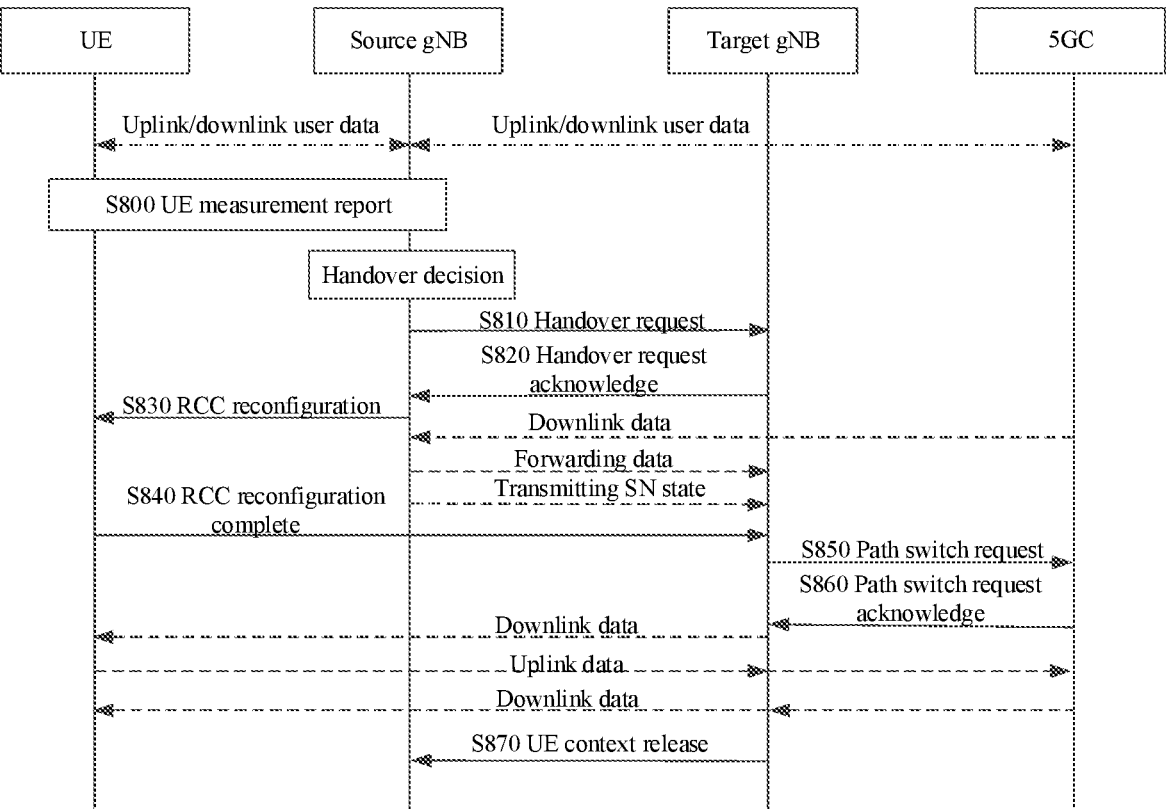
FIG. 8 is a schematic flowchart of a method for compensating timing advance according to a sixth embodiment of the present application.

FIG. 8 is a schematic flowchart of a method for compensating timing advance according to a sixth embodiment of the present application. The applicable scenarios of the embodiment of the present application include but not limited to: handing over a UE from a satellite cell to a terrestrial cell or handing over a UE from one terrestrial cell to another terrestrial cell. As shown in FIG. 8, the method includes the following steps.

Step 800, UE measurement report.

In an embodiment, the source base station to which the source cell belongs configures measurement configuration for the UE in the connected state. The UE performs measurement when the measurement condition is satisfied; and the UE reports the measurement result to the source base station through a measurement report message when the measurement report condition is satisfied.

Step 810, handover request.

In an embodiment, the source base station to which the source cell belongs performs a handover decision. If handover is required, the source base station serving the UE will transmit a handover request (HANDOVER REQUEST in the 5G system) message to the target base station to which a target cell belongs through the inter-BS interface (Xn interface in the 5G system).

Step 820, handover request acknowledge.

In an embodiment, the target base station to which the target cell belongs performs an admission control after receiving the handover request transmitted by the source base station to which the source cell. If admission is possible, a handover command (the specific message in the 5G system is HANDOVER REQUEST ACKNOWLEDGE) may be transmitted to the source base station.

The handover command needs to carry the information associated with TA compensation used for the UE performing uplink transmission in the target cell, and the information associated with TA compensation used for the UE performing uplink transmission in the target cell may include one or more of the following items:

a TA compensation value for the target cell; and indication information of a cell type of the target cell, where the cell type is a terrestrial cell or a satellite cell.

Step 830, RRC reconfiguration.

In an embodiment, after receiving the handover command from the target base station to which the target cell belongs, the source base station to which the source cell notifies the UE of handover configuration information through a RRC reconfiguration procedure. The RRC reconfiguration message needs to include at least the information associated with TA compensation in step 820.

Step 840, RRC reconfiguration complete.

In an embodiment, the UE notifies the target cell of the UE that the handover procedure has been completed by transmitting a RRC reconfiguration complete message to the target cell. The RRC reconfiguration complete message is transmitted by the following two schemes.

In case of RACH-less handover, the UE may directly transmit the RRC reconfiguration complete message using a PUSCH resource allocated by the target cell in the handover command, that is, a first uplink transmission performed by the UE in the target cell is PUSCH transmission.

In case of non-RACH-less handover, the UE is required to first initiate a random access procedure in the target cell to obtain the TA value and PUSCH resources and then transmits the RRC reconfiguration complete message, that is, the first uplink transmission performed by the UE in the target cell is random accessed Msg1 or MsgA.

In the present embodiment, after receiving the information associated with TA compensation, the UE may determine the TA value used for performing the first uplink transmission in the target cell based on the TA related compensation information. The uplink transmission may be: random access Msg1 or MsgA or PUSCH transmission.

The schemes in which the UE determines the TA value used for the UE performing the first uplink transmission in the target cell based on the information associated with TA compensation may be, but not limited to, any one or more of the following items.

The UE may directly determine the TA compensation value for the target cell as a TA value used for performing uplink transmission in the target cell in case that the information associated with TA compensation is "the TA compensation value for the target cell".

The UE may determine a TA value used for performing uplink transmission in the target cell to be 0 when it is determined that the target cell is a terrestrial cell based on the indication information of a cell type of the target cell, in case that the information associated with TA compensation is the indication information of a cell type of the target cell.

Step 850, path switch request.

In an embodiment, the target cell transmits a path switch request to a core network device to notify the core network device of performing data routing change.

Step 860, path switch request acknowledge.

In an embodiment, the core network device transmits a path switch acknowledge message to the target cell.

Step 870, UE context release.

In an embodiment, after receiving the data routing change acknowledge message from the core network device, the target cell notifies the source cell of releasing UE context.

FIG. 9 is a schematic flowchart of a method for compensating timing advance according to a seventh embodiment of the present application. The applicable scenarios of the embodiment of the present application include but not limited to: handing over a UE from a satellite cell to a terrestrial cell or handing over a UE from one terrestrial cell to another terrestrial cell. As shown in FIG. 9, the method includes the following steps.

Step 900, UE measurement report.

In an embodiment, the source base station to which the source cell belongs configures measurement configuration for the UE in the connected state. The UE performs measurement when the measurement condition is satisfied; and the UE reports the measurement result to the source base station through a measurement report message when the measurement report condition is satisfied.

Step 910, handover preparation.

In an embodiment, the source base station to which the source cell belongs performs a handover decision, if the performance of handover is required, and no direct interface is available between the source base station and the target base station, the source base station transmits a handover request message (the message transmitted between the source cell and the core network device in the 5G system is referred to as the handover preparation message: HANDOVER REQUIRED) to the core network device through the interface (NG interface in the 5G system) between the source base station and the core network device.

Step 920, handover request.

In an embodiment, after receiving the handover request for the UE transmitted by the source base station, the core network device transmits a handover request to the target base station (the HANDOVER REQUEST message is used in the 5G system) Step 930, handover request acknowledge.

In an embodiment, the target base station to which the target cell belongs performs an admission control after receiving the handover request transmitted by the core network device through NF interface. If the admission is possible, a handover request acknowledge message (the HANDOVER REQUEST ACKNOWLEDGE message is used in the 5G system) is transmitted to the core network device.

The handover request acknowledge message needs to carry the information associated with TA compensation used for the UE performing uplink transmission in the target cell, and the information associated with TA compensation used for the UE performing uplink transmission in the target cell may include one or more of the following items:

a TA compensation value for the target cell; and indication information of a cell type of the target cell, where the cell type is a terrestrial cell or a satellite cell.

Step 940, handover command.

In an embodiment, the core network device transmits a handover command to the source base station to which the source cell belongs (the specific message in the 5G system is HANDOVER REQUEST ACKNOWLEDGE).

In an embodiment, the handover command may carry information associated with TA compensation used for the UE performing uplink transmission in the target cell.

Step 950, RRC reconfiguration.

In an embodiment, after receiving the handover command from the target base station to which the target cell belongs, the source base station to which the source cell notifies the UE of handover configuration information through a RRC reconfiguration procedure. The RRC reconfiguration message needs to include at least the information associated with TA compensation in step 940.

Step 960, RRC reconfiguration complete.

In an embodiment, the UE notifies the target cell of the UE that the handover procedure has been completed by transmitting a RRC reconfiguration complete message to the target cell. The RRC reconfiguration complete message is transmitted by the following two schemes.

In case of RACH-less handover, the UE may directly transmit the RRC reconfiguration complete message using a PUSCH resource allocated by the target cell in the handover command, that is, a first uplink transmission performed by the UE in the target cell is PUSCH transmission.

In case of non-RACH-less handover, the UE is required to first initiate a random access procedure in the target cell to obtain the TA value and PUSCH resources and then transmits the RRC reconfiguration complete message, that is, the first uplink transmission performed by the UE in the target cell is random accessed Msg1 or MsgA.

In the present embodiment, after receiving the information associated with TA compensation, the UE may determine the TA value used for performing the first uplink transmission in the target cell based on the TA related compensation information. The uplink transmission may be: random access Msg1 or MsgA or PUSCH transmission.

The schemes in which the UE determines the TA value used for the UE performing the first uplink transmission in the target cell based on the information associated with TA compensation may be but not limited to any one or more of the following items.

The UE may directly determine the TA compensation value for the target cell as a TA value used for performing uplink transmission in the target cell in case that the information associated with TA compensation is "the TA compensation value for the target cell".

The UE may determine a TA value used for performing uplink transmission in the target cell to be 0 when it is determined that the target cell is a terrestrial cell based on the indication information of a cell type of the target cell, in case that the information associated with TA compensation is the indication information of a cell type of the target cell.

Step 970, handover notification.

In an embodiment, after the UE successfully accesses the target cell, the target cell is required to notify the core network device that the UE successfully accesses the target cell.

Step 980, UE context release.

In an embodiment, the core network device notifies the source cell to release the context.

Step 990, UE context release complete.

In an embodiment, the source cell responds an acknowledgment message to the core network device.

The solutions according to the embodiments of the present application may be applicable to various systems, especially 5G systems. For example, applicable systems may be a global system of mobile communication (GSM) system, a code division multiple access (CDMA) system, a wideband code division multiple access (WCDMA) general packet wireless service (general packet radio service, GPRS) system, a long term evolution (LTE) system, a LTE frequency division duplex (FDD) system, a LTE time division duplex (TDD) system, a long term evolution advanced (LTE-A) system, a universal mobile telecommunication system (UMTS), a worldwide interoperability for microwave access (WiMAX) system, a 5G New Radio (NR) system, etc. These various systems include a terminal and a network device. The system may also include a core network device part, such as an evolved packet system (EPS), a 5G system (5GS), and the like.

The terminal in the embodiments of the present application may be a device that provides voice and/or data connectivity to a user, a handheld device with a wireless connection function, or other processing device connected to a wireless modem. In different systems, the names of the terminal may be different. For example, in the 5G system, the terminal may be called as user equipment (UE). A wireless terminal may communicate with one or more core network devices (CN) via a radio access network (RAN), and the wireless terminal may be a mobile terminal, such as a mobile phone (or "cellular" phone) and computers with mobile terminal, e.g., a portable mobile device, a pocket-sized mobile device, a hand-held mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A wireless terminal device may also be called a system, a subscriber unit, a subscriber station, a mobile station, a mobile, a remote station, an access point, a remote terminal, an access terminal, a user terminal, a user agent, and a user device, which are not limited in the embodiments of the present application.

The base station involved in the embodiments of the present application may include cells that provide services for the UE. Depending on the specific application, the base station may also be called an access point, or may be a device in the access network that communicates with wireless terminal through one or more sectors on the air interface, or other names. The base station may be configured to exchange received air frames with Internet Protocol (IP) packets, and act as a router between wireless terminal and the rest of the access network, and the rest of the access network may include an Internet protocol (IP) communication network. The base station may also coordinate attribute management for the air interface. For example, the network device in the embodiments of the present application may be a base transceiver station (BTS) in a global system for mobile communications (GSM) or a code division multiple access (CDMA), may also be a node B in a wide-band code division multiple access (WCDMA), may also be an evolutional node B (eNB or e-Node B) in a long term evolution (LTE) system, a 5G base station (gNB) in 5G network architecture (next generation system), may also be a Home evolved Node B (HeNB), a relay node (relay node), a femto, a pico base station (pico), etc., which are not limited in the embodiments of the present application. In some network structures, the base station may include a centralized unit (CU) node and a distributed unit (DU) node, and the centralized unit and the distributed unit may also be geographically separated.

FIG. 10 is a schematic structural diagram of a base station according to an embodiment of the present application. As shown in FIG. 10, the base station includes a memory 1001, a transceiver 1002, and a processor 1003, in which:

the memory 1001 is configured to store a computer program: the transceiver 1002 is configured to transmit and receive data under the control of the processor: the processor 1003 is configured to read the computer program in the memory and perform the following operations:

transmitting, by a target base station to which a target cell belongs, information associated with timing advance (TA) compensation used during UE performing uplink transmission in the target cell to a source base station to which a source cell belongs through an interface between network devices;

the transceiver 1002 is configured to receive and transmit data under the control of the processor 1003.

In FIG. 10, a bus architecture may include any number of interconnected buses and bridges, which are linked together through various circuits of one or more processors represented by processor 1003 and one or more memories represented by the memory 1002. The bus architecture may also link together various other circuits, such as peripherals, voltage regulators, and power management circuits, which are well known in the art, and therefore will not be further described in the present application. The bus interface provides an interface. The transceiver 1002 may be multiple elements, i.e., including a transmitter and a receiver, units for providing communication with various other devices over transmission media including wireless channels, wired channels, fiber optic cables, and the like. The processor 1003 is responsible for managing the bus architecture and general processing, and the memory 1001 may store data used by the processor 1003 when performing operations.

The processor 1003 may be a central processing unit (CPU), an application specific integrated circuit (ASIC), a field-programmable gate array (FPGA), or a complex programmable logic device (CPLD), the processor may also use a multi-core architecture.

It should be noted here that the above-mentioned apparatus according to the embodiments of the present application may implement all the method steps implemented by the above-mentioned method embodiments, and may achieve the same effect. The same parts and beneficial effects as the same method embodiments will not be repeated here.

In any one of various embodiments above, the source cell or the target cell is any one of the following types of cells:

a terrestrial cell;

a satellite cell.

The above-mentioned base station according to the embodiments of the present application may implement all the method steps implemented by the above-mentioned method embodiments, and may achieve the same effect. The same parts and beneficial effects as the same method embodiments will not be repeated here.

In any one of various embodiments above, the performing uplink transmission in the target cell is a first message for the random access procedure initiated by a UE in the target cell or a first PUSCH transmission performed by a UE in the target cell.

The above-mentioned base station according to the embodiments of the present application may implement all the method steps implemented by the above-mentioned method embodiments, and may achieve the same effect. The same parts and beneficial effects as the same method embodiments will not be repeated here.

In any one of various embodiments above, the interface between the network devices is:

an Xn interface between a source base station and a target base station; or a next generation (NG) interface between a target base station and a core network device; or an NG interface between the core network device and the source base station.

The above-mentioned base station according to the embodiments of the present application may implement all the method steps implemented by the above-mentioned method embodiments, and may achieve the same effect. The same parts and beneficial effects as the same method embodiments will not be repeated here.

In any one of various embodiments above, the transmitting, by a target base station to which a target cell belongs, information associated with TA compensation used during UE performing uplink transmission in the target cell to a source base station to which a source cell belongs through an interface between network devices, includes:

transmitting the information associated with TA compensation to a source base station through the Xn interface after receiving a handover request for UE transmitted by the source base station through the Xn interface, in case that the interface between the network devices is an Xn interface; or receiving a handover request for the UE transmitted by a core network device, in case that the interface between the network devices is an NG interface, where the handover request is transmitted by the source base station to the core network device through the NG interface; and transmitting the information associated with TA compensation to the core network device for the core network device to transmit the information associated with TA compensation to the source base station through the NG interface.

The above-mentioned base station according to the embodiments of the present application may implement all the method steps implemented by the above-mentioned method embodiments, and may achieve the same effect. The same parts and beneficial effects as the same method embodiments will not be repeated here.

In any one of various embodiments above, the information associated with TA compensation includes any one or more of the following items:

transmission delay of feeder links in the target cell;

a TA compensation value for the target cell;

ephemeris information;

location information of a reference point in the target cell and TA corresponding to the reference point in the target cell; and indication information of a cell type of the target cell, where the cell type is a terrestrial cell or a satellite cell.

The above-mentioned base station according to the embodiments of the present application may implement all the method steps implemented by the above-mentioned method embodiments, and may achieve the same effect. The same parts and beneficial effects as the same method embodiments will not be repeated here.

In any one of various embodiments above, in case that the target cell is a terrestrial cell, the information associated with TA compensation includes any one or more of the following items:

a TA compensation value for the target cell; and indication information of a cell type of the target cell.

The above-mentioned base station according to the embodiments of the present application may implement all the method steps implemented by the above-mentioned method embodiments, and may achieve the same effect. The same parts and beneficial effects as the same method embodiments will not be repeated here.

In any one of the embodiments above, in case that the target cell is a satellite cell and the satellite is a pass-through mode satellite, the operation further includes: compensating, by the target base station, transmission delay of feeder links.

The above-mentioned base station according to the embodiments of the present application may implement all the method steps implemented by the above-mentioned method embodiments, and may achieve the same effect. The same parts and beneficial effects as the same method embodiments will not be repeated here.

Figure 11:
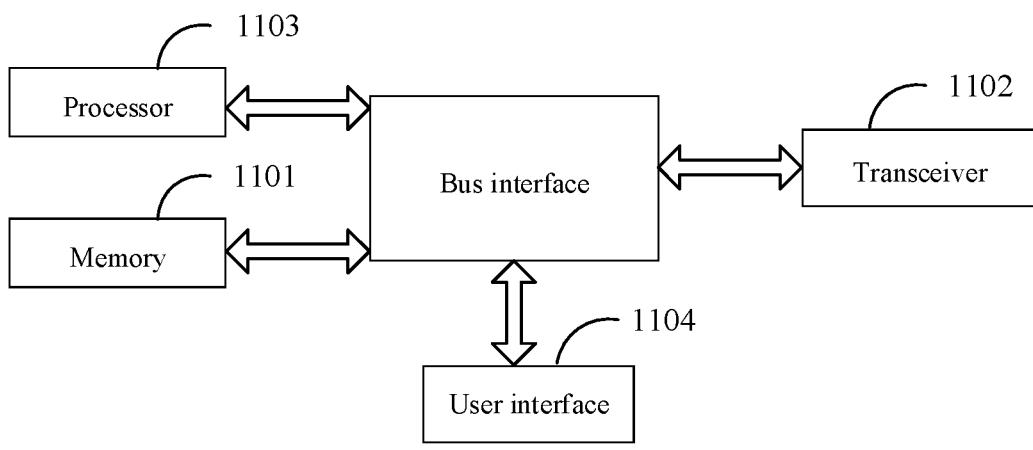
FIG. 11 is a schematic structural diagram of a terminal according to an embodiment of the present application.

FIG. 11 is a schematic structural diagram of a terminal according to an embodiment of the present application. As shown in FIG. 11, the base station includes a memory 1101, a transceiver 1102, and a processor 1103, in which:

the memory 1101 is configured to store a computer program: the transceiver 1102 is configured to transmit and receive data under the control of the processor: the processor 1103 is configured to read the computer program in the memory and perform the following operations:

receiving information associated with timing advance (TA) compensation transmitted by a source base station to which a source cell, where the information associated with TA compensation is transmitted by a target base station to which a target cell belongs to a source base station to which a source cell belongs, through an interface between network devices; and performing uplink transmission based on the information associated with TA compensation;

the transceiver 1102 is configured to receive and transmit data under the control of the processor 1103.

In FIG. 11, a bus architecture may include any number of interconnected buses and bridges, which are linked together through various circuits of one or more processors represented by processor 1103 and one or more memories represented by the memory 1101. The bus architecture may also link together various other circuits, such as peripherals, voltage regulators, and power management circuits, which are well known in the art, and therefore will not be further described in the present application. The bus interface provides an interface. The transceiver 1102 may be multiple elements, i.e., including a transmitter and a receiver, units for providing communication with various other devices over transmission media including wireless channels, wired channels, fiber optic cables, and the like. For different user equipment, the user interface 1104 may also be an interface may externally or internally connect the required equipment, and the connected equipment includes, but not limited to, a keypad, a display, a speaker, a microphone, a joystick, and the like.

The processor 1103 is responsible for managing the bus architecture and general processing, and the memory 1101 may store data used by the processor 1103 when performing operations.

The processor 1103 may be a central processing unit (CPU), an application specific integrated circuit (ASIC), a field-programmable gate array (FPGA), or a complex programmable logic device (CPLD), the processor may also use a multi-core architecture.

The processor is configured to perform any one of the methods of the embodiments of the present application based on the obtained executable instructions by invoking the computer program stored in the memory. The processor and memory may also be physically separated.

It should be noted here that the above-mentioned terminal according to the embodiments of the present application may implement all the method steps implemented by the above-mentioned method embodiments, and may achieve the same effect. The same parts and beneficial effects as the same method embodiments will not be repeated here.

In any one of various embodiments above, the source cell or the target cell is any one of the following types of cells:

a terrestrial cell;

a satellite cell.

The above-mentioned terminal according to the embodiments of the present application may implement all the method steps implemented by the above-mentioned method embodiments, and may achieve the same effect. The same parts and beneficial effects as the same method embodiments will not be repeated here.

In any one of various embodiments above, the performing uplink transmission is a first message for the random access procedure initiated by a UE in the target cell or a first PUSCH transmission performed by a UE in the target cell.

The above-mentioned terminal according to the embodiments of the present application may implement all the method steps implemented by the above-mentioned method embodiments, and may achieve the same effect. The same parts and beneficial effects as the same method embodiments will not be repeated here.

In any one of various embodiments above, the interface between the network devices is:

an Xn interface between a source base station and a target base station; or an NG interface between a target base station and a core network device; or an NG interface between the core network device and the source base station.

The above-mentioned terminal according to the embodiments of the present application may implement all the method steps implemented by the above-mentioned method embodiments, and may achieve the same effect. The same parts and beneficial effects as the same method embodiments will not be repeated here.

In any one of various embodiments above, the information associated with TA compensation includes any one or more of the following items:

transmission delay of feeder links in the target cell;

a TA compensation value for the target cell;

ephemeris information;

location information of a reference point in the target cell and TA corresponding to the reference point in the target cell; and indication information of a cell type of the target cell, where the cell type may be the terrestrial cell or the satellite cell.

The above-mentioned terminal according to the embodiments of the present application may implement all the method steps implemented by the above-mentioned method embodiments, and may achieve the same effect. The same parts and beneficial effects as the same method embodiments will not be repeated here.

In any one of various embodiments above, the performing uplink transmission based on the information associated with TA compensation includes:

determining, based on location information of UE, the ephemeris information and the transmission delay of feeder links in the target cell, a TA value used for performing uplink transmission in the target cell, in case that the information associated with TA compensation is the transmission delay of feeder links in the target cell;

determining the TA compensation value for the target cell as a TA value used for performing uplink transmission in the target cell, in case that the information associated with TA compensation is the TA compensation value for the target cell;

determining, based on UE location information and the ephemeris information, a TA value used for performing uplink transmission in the target cell, in case that the information associated with TA compensation is the ephemeris information;

calculating a difference between TA corresponding to the target cell and TA for the UE based on the UE location information and the location information of the reference point in the target cell, and determining a TA value used for performing uplink transmission in the target cell according to the difference and TA corresponding to the reference point in the target cell, in case that the information associated with TA compensation is location information of a reference point in the target cell and the TA corresponding to the reference point in the target cell;

determining that the target cell to be a terrestrial cell based on the indication information of a cell type of the target cell and determining a TA value used for performing uplink transmission in the target cell to be 0, in case that the information associated with TA compensation is the indication information of a cell type of the target cell; and performing uplink transmission in the target cell based on the TA value.

The above-mentioned terminal according to the embodiments of the present application may implement all the method steps implemented by the above-mentioned method embodiments, and may achieve the same effect. The same parts and beneficial effects as the same method embodiments will not be repeated here.

In any one of various embodiments above, the receiving information associated with TA compensation transmitted by a source base station to which a source cell, includes:

receiving a radio resource control (RRC) reconfiguration message transmitted by the source base station, where the RRC reconfiguration message includes the information associated with TA compensation.

The above-mentioned terminal according to the embodiments of the present application may implement all the method steps implemented by the above-mentioned method embodiments, and may achieve the same effect. The same parts and beneficial effects as the same method embodiments will not be repeated here.

Figure 12:
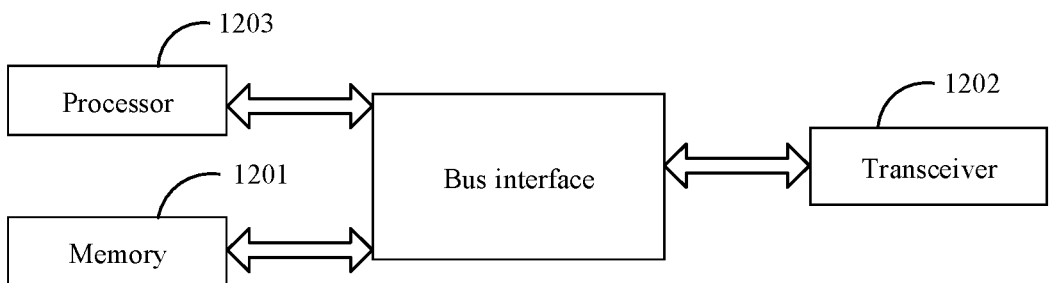
FIG. 12 is a schematic structural diagram of a base station according to another embodiment of the present application.

FIG. 12 is a schematic structural diagram of a base station according to another embodiment of the present application. As shown in FIG. 12, the base station includes a memory 1201, a transceiver 1202, and a processor 1203, in which:

the memory 1201 is configured to store a computer program: the transceiver 1002 is configured to transmit and receive data under the control of the processor: the processor 1203 is configured to read the computer program in the memory and perform the following operations:

obtaining information associated with TA compensation used during UE performing uplink transmission in the target cell, transmitted by a target base station to which a target cell belongs through the interface between network devices; and transmitting the information associated with TA compensation to the UE;

the transceiver 1202 is configured to receive and transmit data under the control of the processor 1203.

In FIG. 12, a bus architecture may include any number of interconnected buses and bridges, which are linked together through various circuits of one or more processors represented by processor 1203 and one or more memories represented by the memory 1201. The bus architecture may also link together various other circuits, such as peripherals, voltage regulators, and power management circuits, which are well known in the art, and therefore will not be further described in the present application. The bus interface provides an interface. Transceiver 1202 may be multiple elements, i.e., including a transmitter and a receiver, units for providing communication with various other devices over transmission media including wireless channels, wired channels, fiber optic cables, and the like. The processor 1203 is responsible for managing the bus architecture and general processing, and the memory 1201 may store data used by the processor 1203 when performing operations.

The processor 1203 may be a central processing unit (CPU), an application specific integrated circuit (ASIC), a field-programmable gate array (FPGA), or a complex programmable logic device (CPLD), the processor may also use a multi-core architecture.

It should be noted here that the above-mentioned apparatus according to the embodiments of the present application may implement all the method steps implemented by the above-mentioned method embodiments, and may achieve the same effect. The same parts and beneficial effects as the same method embodiments will not be repeated here.

In any one of various embodiments above, the source cell or the target cell is any one of the following types of cells:

a terrestrial cell;

a satellite cell.

The above-mentioned base station according to the embodiments of the present application may implement all the method steps implemented by the above-mentioned method embodiments, and may achieve the same effect. The same parts and beneficial effects as the same method embodiments will not be repeated here.

In any one of various embodiments above, the performing uplink transmission in the target cell is a first message for the random access procedure initiated by a UE in the target cell or a first PUSCH transmission performed by a UE in the target cell.

The above-mentioned base station according to the embodiments of the present application may implement all the method steps implemented by the above-mentioned method embodiments, and may achieve the same effect. The same parts and beneficial effects as the same method embodiments will not be repeated here.

In any one of various embodiments above, the interface between the network devices is:

an Xn interface between a source base station and a target base station; or an NG interface between a target base station and a core network device; or an NG interface between the core network device and the source base station.

The above-mentioned base station according to the embodiments of the present application may implement all the method steps implemented by the above-mentioned method embodiments, and may achieve the same effect. The same parts and beneficial effects as the same method embodiments will not be repeated here.

In any one of various embodiments above, the obtaining information associated with TA compensation used during UE performing uplink transmission in the target cell, transmitted by a target base station to which a target cell belongs through the interface between network devices, includes:

receiving information associated with TA compensation transmitted by the target base station through the Xn interface after transmitting a handover request for the UE to the target base station through the Xn interface, in case that the interface between the network devices is an Xn interface;

transmitting the handover request for the UE to a core network device through the NG interface for the target base station to transmit the information associated with TA compensation to the core network device after the handover request forwarded by the core network device is received, in case that the interface between the network devices is an NG interface; and receiving the information associated with TA compensation transmitted by the core network device through the NG interface.

The above-mentioned base station according to the embodiments of the present application may implement all the method steps implemented by the above-mentioned method embodiments, and may achieve the same effect. The same parts and beneficial effects as the same method embodiments will not be repeated here.

In any one of various embodiments above, the information associated with TA compensation includes any one or more of the following items:

transmission delay of feeder links in the target cell;

a TA compensation value for the target cell;

ephemeris information;

location information of a reference point in the target cell and TA corresponding to the reference point in the target cell; and indication information of a cell type of the target cell, where the cell type is a terrestrial cell or a satellite cell.

The above-mentioned base station according to the embodiments of the present application may implement all the method steps implemented by the above-mentioned method embodiments, and may achieve the same effect. The same parts and beneficial effects as the same method embodiments will not be repeated here.

In any one of various embodiments above, the transmitting the information associated with TA compensation to the UE includes:

transmitting a RRC reconfiguration message to the UE, where the RRC reconfiguration message includes the information associated with TA compensation.

The above-mentioned base station according to the embodiments of the present application may implement all the method steps implemented by the above-mentioned method embodiments, and may achieve the same effect. The same parts and beneficial effects as the same method embodiments will not be repeated here.

Figure 13:
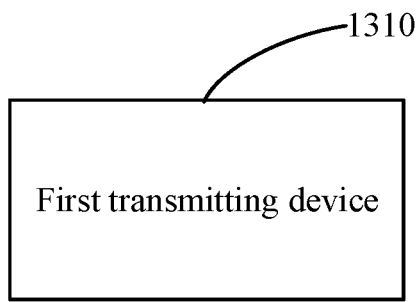
FIG. 13 is a schematic structural diagram of a base station according to another embodiment of the present application.

FIG. 13 is a schematic structural diagram of a base station according to yet another embodiment of the present application. As shown in FIG. 13, the base station includes a first transmitting device 1310, in which:

the first transmitting device, configured to transmit, by a target base station to which a target cell belongs, information associated with TA compensation used during UE performing uplink transmission in the target cell to a source base station to which a source cell belongs through an interface between network devices.

In an embodiment, the target base station to which the target cell belongs transmits the information associated with TA compensation used during UE performing uplink transmission in the target cell to a source base station to which a source cell belongs via the first transmitting device 1310 through an interface between network devices and the source base station transmits the information to the UE for performing uplink transmission after receiving it.

In the base station according to the embodiments of the present application, by transmitting, to UE, the information associated with TA compensation used during UE performing uplink transmission in the target cell during cell handover procedure, UE may clearly and accurately determine the TA pre-compensation value used when UE is handed over to the target cell and the TA compensation is reasonably performed, which improves the rate of successful cell handover and reduces handover delay.

It should be noted here that the above-mentioned base station according to the embodiments of the present application may implement all the method steps implemented by the above-mentioned method embodiments, and may achieve the same effect. The same parts and beneficial effects as the same method embodiments will not be repeated here.

Figure 14:
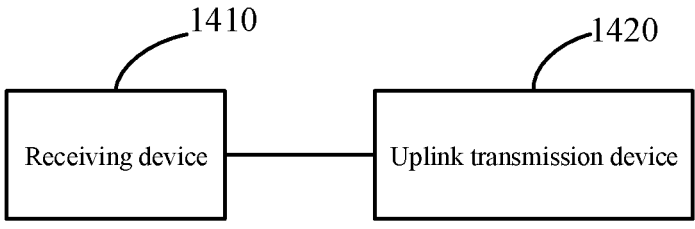
FIG. 14 is a schematic structural diagram of a terminal according to another embodiment of the present application.

FIG. 14 is a schematic structural diagram of a terminal according to another embodiment of the present application. As shown in FIG. 14, the terminal includes a receiving device 1410 and an uplink transmission device 1420, in which:

a receiving device 1410 is configured to receive information associated with TA compensation transmitted by a source base station to which a source cell, where the information associated with TA compensation is transmitted by a target base station to which a target cell belongs to a source base station to which a source cell belongs, through an interface between network devices; and an uplink transmission device 1420 is configured to perform uplink transmission based on the information associated with TA compensation.

In an embodiment, the UE receives information associated with TA compensation transmitted by the source cell via the receiving device 1410 and performs uplink transmission based on the information associated with TA compensation via the uplink transmission device 1420. The information associated with TA compensation is transmitted by a target base station to which a target cell belongs to a source base station to which a source cell belongs, through an interface between network devices.

In the terminal according to the embodiments of the present application, by receiving the information associated with TA compensation used during UE performing uplink transmission in the target cell, provided by the target base station during cell handover, UE may clearly and accurately determine the TA pre-compensation value used when UE is handed over to the target cell and the TA compensation is reasonably performed, which improves the rate of successful cell handover and reduces handover delay.

It should be noted here that the above-mentioned terminal according to the embodiments of the present application may implement all the method steps implemented by the above-mentioned method embodiments, and may achieve the same effect. The same parts and beneficial effects as the same method embodiments will not be repeated here.

Figure 15:
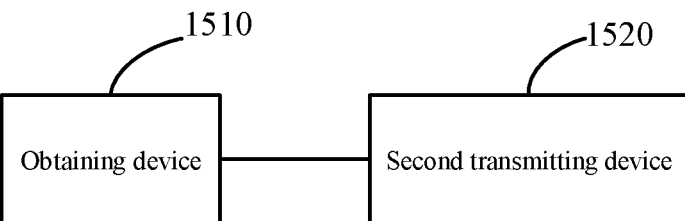
FIG. 15 is a schematic structural diagram of a base station according to still yet another embodiment of the present application.

FIG. 15 is a schematic structural diagram of a base station according to still yet another embodiment of the present application. As shown in FIG. 15, the base station includes an obtaining device 1510 and a second transmitting device 1520, in which:

an obtaining device 1510 is configured to obtain information associated with TA compensation used during UE performing uplink transmission in the target cell, transmitted by a target base station to which a target cell belongs through the interface between network devices; and the second transmitting device 1520 is configured to transmit the information associated with TA compensation to the UE.

In an embodiment, a source base station to which a source cell belongs obtains the information associated with TA compensation used during UE performing uplink transmission in the target cell, transmitted by the target base station to which the target cell belongs through the interface between network devices via the obtaining device 1510; and then transmits the information associated with TA compensation to the UE via the second transmitting device 1520 for the UE performing uplink transmission based on the information associated with TA compensation.

In the base station according to the embodiments of the present application, by receiving the information associated with TA compensation used during UE performing uplink transmission in the target cell, provided by the target base station during cell handover of UE and transmitting the information to the UE, UE may clearly and accurately determine the TA pre-compensation value used when UE is handed over to the target cell and the TA compensation is reasonably performed, which improves the rate of successful cell handover and reduces handover delay.

It should be noted here that the above-mentioned apparatus according to the embodiments of the present application may implement all the method steps implemented by the above-mentioned method embodiments, and may achieve the same effect. The same parts and beneficial effects as the same method embodiments will not be repeated here.

It should be noted that, the division of units in the embodiments of the present application is schematic, and is only a logical function division, and there may be other division manners in actual implementation. In addition, the functional units in the various embodiments of the present application may be integrated into one processing unit, or each unit may exist alone physically, or two or more units may be integrated into one unit. The above-mentioned integrated unit may be implemented in the form of hardware or software functional unit.

If the integrated unit is implemented in the form of a software functional unit and sold or used as an independent product, it may be stored in a computer readable storage medium. Based on such understanding, the embodiments of the present application may be embodied in the form of a software product, which is stored in a storage medium, including several instructions to cause a computer device (which may be a personal computer, server, or network device, etc.) or a processor to perform all or part of the steps of the methods described in the respective embodiments of the present application. The storage medium described above includes various media that may store program codes such as U disk, mobile hard disk, read-only memory (ROM), random access memory (RAM), magnetic disk, or optical disk.

It should be noted here that the above-mentioned apparatus according to the embodiments of the present application may implement all the method steps implemented by the above-mentioned method embodiments, and may achieve the same effect. The same parts and beneficial effects as the same method embodiments will not be repeated here.

Based on any one embodiment above, an embodiment of the present application further provides a non-transitory computer readable storage medium having stored thereon a computer program that cause a processor to execute the steps of the beam indication method described above, which, for example, includes:

transmitting, by a target base station to which a target cell belongs, information associated with timing advance (TA) compensation used during UE performing uplink transmission in the target cell to a source base station to which a source cell belongs through an interface between network devices.

Based on any one embodiment above, an embodiment of the present application further provides a non-transitory computer readable storage medium having stored thereon a computer program that cause a processor to execute the steps of the beam indication method described above, which, for example, includes:

receiving information associated with timing advance (TA) compensation transmitted by a source base station to which a source cell, where the information associated with TA compensation is transmitted by a target base station to which a target cell belongs to a source base station to which a source cell belongs, through an interface between network devices; and performing uplink transmission based on the information associated with TA compensation.

Based on any one embodiment above, an embodiment of the present application further provides a non-transitory computer readable storage medium having stored thereon a computer program that cause a processor to execute the steps of the beam indication method described above, which, for example, includes:

obtaining information associated with TA compensation used during UE performing uplink transmission in the target cell, transmitted by a target base station to which a target cell belongs through the interface between network devices; and transmitting the information associated with TA compensation to the UE.

The computer program stored on above-mentioned computer readable storage medium according to the embodiments of the present application, causes a processor to perform all the method steps implemented by the above-mentioned method embodiments, and may achieve the same effect. The same parts and beneficial effects as the same method embodiments will not be repeated here.

The computer readable storage medium may be any available medium or data storage device that may be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof may be implemented by computer-executable instructions. These computer-executable instructions may be provided to processors of a general purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor-executable instructions may also be stored in a processor-readable memory may direct a computer or other programmable data processing apparatus to operate in a particular manner, and the instructions stored in the processor-readable memory may result in a manufacture including instruction means, the instruction means may perform the functions specified in one or more flows of the flowchart and/or one or more blocks of the block diagram.

These processor-executable instructions may also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

What is claimed is:

1. A method for compensating timing advance, comprising:

transmitting, by a target base station to which a target cell belongs, information associated with timing advance (TA) compensation to a source base station to which a source cell belongs through an interface between network devices, wherein the information associated with TA compensation is used during a user equipment (UE) performing uplink transmission in the target cell;

wherein the information associated with TA compensation comprises one or more of the following items:

transmission delay of feeder links in the target cell;

a TA compensation value for the target cell;

ephemeris information;

location information of a reference point in the target cell and TA corresponding to the reference point in the target cell; and indication information of a cell type of the target cell, wherein the cell type is the terrestrial cell or the satellite cell;

wherein the information associated with TA compensation is used to make the UE perform uplink transmission based on the information associated with TA compensation, comprising:

making the UE determine, based on location information of the UE, the ephemeris information and the transmission delay of feeder links in the target cell, a TA value used for performing uplink transmission in the target cell, in case that the information associated with TA compensation is the transmission delay of feeder links in the target cell;

making the UE determine the TA compensation value for the target cell as a TA value used for performing uplink transmission in the target cell, in case that the information associated with TA compensation is the TA compensation value for the target cell;

making the UE determine, based on UE location information and the ephemeris information, a TA value used for performing uplink transmission in the target cell, in case that the information associated with TA compensation is the ephemeris information;

making the UE calculate a difference between TA corresponding to the target cell and TA for the UE based on the UE location information and the location information of the reference point in the target cell, and determine a TA value used for performing uplink transmission in the target cell based on the difference and TA corresponding to the reference point in the target cell, in case that the information associated with TA compensation is location information of a reference point in the target cell and the TA corresponding to the reference point in the target cell;

making the UE determine that the target cell to be a terrestrial cell based on the indication information of a cell type of the target cell and determine a TA value used for performing uplink transmission in the target cell to be 0, in case that the information associated with TA compensation is the indication information of a cell type of the target cell; and making the UE perform uplink transmission in the target cell based on the TA value.

2. The method of claim 1, wherein the performing uplink transmission in the target cell is a first message for a random access procedure initiated by the UE in the target cell or a first PUSCH transmission performed by the UE in the target cell.

3. The method of claim 1, wherein the interface between network devices comprises:

an Xn interface between a source base station and a target base station; or a next generation (NG) interface between a target base station and a core network device; or an NG interface between the core network device and the source base station.

4. The method of claim 3, wherein the transmitting, by a target base station to which a target cell belongs, information associated with TA compensation to a source base station to which a source cell belongs through an interface between network devices, comprises:

transmitting the information associated with TA compensation to a source base station through the Xn interface after receiving a handover request for UE transmitted by the source base station through the Xn interface, in case that the interface between the network devices is an Xn interface;

receiving a handover request for the UE transmitted by a core network device, in case that the interface between the network devices is an NG interface, wherein the handover request is transmitted by the source base station to the core network device through the NG interface; and transmitting the information associated with TA compensation to the core network device for the core network device to transmit the information associated with TA compensation to the source base station through the NG interface.

5. The method of claim 1, wherein in case that the target cell is a pass-through mode satellite cell, the method further comprises: compensating, by the target base station, transmission delay of feeder links.

6. A base station, comprising:
a processor;
a memory storing a computer program; and
a transceiver configured to transmit and receive data under the control of the processor,
wherein the computer program, when executed by the processor, causes the base station to perform the method of claim 1.

7. A method for compensating timing advance, performed by a user equipment (UE), comprising:
receiving information associated with timing advance (TA) compensation transmitted by a source base station to which a source cell, wherein the information associated with TA compensation is transmitted by a target base station to which a target cell belongs to a source base station to which a source cell belongs, through an interface between network devices; and
performing uplink transmission based on the information associated with TA compensation,
wherein the information associated with TA compensation comprises one or more of the following items:
transmission delay of feeder links in the target cell;
a TA compensation value for the target cell;
ephemeris information;
location information of a reference point in the target cell and TA corresponding to the reference point in the target cell; and
indication information of a cell type of the target cell, wherein the cell type is the terrestrial cell or the satellite cell;
wherein the performing uplink transmission based on the information associated with TA compensation comprises:
determining, based on location information of the UE, the ephemeris information and the transmission delay of feeder links in the target cell, a TA value used for performing uplink transmission in the target cell, in case that the information associated with TA compensation is the transmission delay of feeder links in the target cell;
determining the TA compensation value for the target cell as a TA value used for performing uplink transmission in the target cell, in case that the information associated with TA compensation is the TA compensation value for the target cell;
determining, based on UE location information and the ephemeris information, a TA value used for performing uplink transmission in the target cell, in case that the information associated with TA compensation is the ephemeris information;
calculating a difference between TA corresponding to the target cell and TA for the UE based on UE location information and the location information of the reference point in the target cell, and determining a TA value used for performing uplink transmission in the target cell based on the difference and TA corresponding to the reference point in the target cell, in case that the information associated with TA compensation is location information of a reference point in the target cell and the TA corresponding to the reference point in the target cell;
determining that the target cell to be a terrestrial cell based on the indication information of a cell type of the target cell and determining a TA value used for performing uplink transmission in the target cell to be 0, in case that the information associated with TA compensation is the indication information of a cell type of the target cell; and
performing uplink transmission in the target cell based on the TA value.

8. The method of claim 7, wherein the source cell or the target cell is any one of the following types of cells:
a terrestrial cell;
a satellite cell.

9. The method of claim 7, wherein the performing uplink transmission is a first message for a random access procedure initiated by the UE in the target cell or a first PUSCH transmission performed by the UE in the target cell.

10. The method of claim 7, wherein the interface between network devices comprises:
an Xn interface between a source base station and a target base station; or
a next generation (NG) interface between a target base station and a core network device; or
an NG interface between the core network device and the source base station.

11. The method of claim 7, wherein the receiving information associated with TA compensation transmitted by a source base station to which a source cell, comprises:
receiving a radio resource control (RRC) reconfiguration message transmitted by the source base station, wherein the RRC reconfiguration message includes the information associated with TA compensation.

12. A user equipment (UE), comprising:
a processor;
a memory storing a computer program; and
a transceiver configured to transmit and receive data under the control of the processor,
wherein the computer program, when executed by the processor, causes the UE to perform the following operations:
receiving information associated with timing advance (TA) compensation transmitted by a source base station to which a source cell, wherein the information associated with TA compensation is transmitted by a target base station to which a target cell belongs to a source base station to which a source cell belongs, through an interface between network devices; and
performing uplink transmission based on the information associated with TA compensation,
wherein the information associated with TA compensation comprises one or more of the following items:
transmission delay of feeder links in the target cell;
a TA compensation value for the target cell;
ephemeris information;
location information of a reference point in the target cell and TA corresponding to the reference point in the target cell; and
indication information of a cell type of the target cell, wherein the cell type is the terrestrial cell or the satellite cell;

wherein the performing uplink transmission based on the information associated with TA compensation comprises:

determining, based on location information of the UE, the ephemeris information and the transmission delay of feeder links in the target cell, a TA value used for performing uplink transmission in the target cell, in case that the information associated with TA compensation is the transmission delay of feeder links in the target cell;

determining the TA compensation value for the target cell as a TA value used for performing uplink transmission in the target cell, in case that the information associated with TA compensation is the TA compensation value for the target cell;

determining, based on UE location information and the ephemeris information, a TA value used for performing uplink transmission in the target cell, in case that the information associated with TA compensation is the ephemeris information;

calculating a difference between TA corresponding to the target cell and TA for the UE based on UE location information and the location information of the reference point in the target cell, and determining a TA value used for performing uplink transmission in the target cell based on the difference and TA corresponding to the reference point in the target cell, in case that the information associated with TA compensation is location information of a reference point in the target cell and the TA corresponding to the reference point in the target cell;

determining that the target cell to be a terrestrial cell based on the indication information of a cell type of the target cell and determining a TA value used for performing uplink transmission in the target cell to be 0, in case that the information associated with TA compensation is the indication information of a cell type of the target cell; and performing uplink transmission in the target cell based on the TA value.

13. The UE of claim 12, wherein the performing uplink transmission is a first message for a random access procedure initiated by the UE in the target cell or a first PUSCH transmission performed by the UE in the target cell.

14. The UE of claim 12, wherein the interface between network devices comprises:

an Xn interface between a source base station and a target base station; or a next generation (NG) interface between a target base station and a core network device; or an NG interface between the core network device and the source base station.

15. The UE of claim 12, wherein the receiving information associated with TA compensation transmitted by a source base station to which a source cell, comprises:

receiving a radio resource control (RRC) reconfiguration message transmitted by the source base station, wherein the RRC reconfiguration message includes the information associated with TA compensation.

* * * * *